US007795595B2

(12) United States Patent
Reber et al.

(10) Patent No.: US 7,795,595 B2
(45) Date of Patent: Sep. 14, 2010

(54) METHOD AND SYSTEM FOR CALIBRATING ACQUIRED SPECTRA FOR USE IN SPECTRAL ANALYSIS

(75) Inventors: Edward L. Reber, Idaho Falls, ID (US); Kenneth W. Rohde, Idaho Falls, ID (US); Larry G. Blackwood, Bozeman, MT (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 74 days.

(21) Appl. No.: 12/358,883

(22) Filed: Jan. 23, 2009

(65) Prior Publication Data
US 2009/0150105 A1 Jun. 11, 2009

Related U.S. Application Data

(60) Continuation of application No. 11/877,192, filed on Oct. 23, 2007, now Pat. No. 7,501,637, which is a division of application No. 11/100,800, filed on Apr. 6, 2005, now Pat. No. 7,307,256.

(51) Int. Cl.
*G01T 3/00* (2006.01)
(52) U.S. Cl. .............................................. 250/390.01
(58) Field of Classification Search .............. 250/252.1, 250/370.01, 390.01; 702/85, 179
See application file for complete search history.

(56) References Cited

U.S. PATENT DOCUMENTS

| 5,171,986 | A | * | 12/1992 | Loomis et al. ........... 250/252.1 |
| 5,838,759 | A | | 11/1998 | Armistead |
| 6,791,089 | B1 | * | 9/2004 | Caffrey et al. ........... 250/358.1 |
| 6,937,692 | B2 | | 8/2005 | Johnson et al. |
| 2003/0201394 | A1 | | 10/2003 | Peoples |
| 2004/0232054 | A1 | | 11/2004 | Brown et al. |
| 2005/0105681 | A1 | | 5/2005 | Kang et al. |
| 2005/0156734 | A1 | | 7/2005 | Zerwekh et al. |

OTHER PUBLICATIONS

Webpage, "Gamma Ray Detector Experience," Western Kentucky Univ.; http://www.wku.edu/API/research/detectors/detectorexperience.htm; (Jan. 2005) 2 pages.
Chichester, David L., et al., Webpage; The Industrial Physicist; http://www.aip,org/tip/INPHFA/vol-9/iss-6/p22.html; (Jan. 2005); 6 pages.

* cited by examiner

*Primary Examiner*—David P Porta
*Assistant Examiner*—Marcus H Taningco
(74) *Attorney, Agent, or Firm*—TraskBritt

(57) ABSTRACT

A method for calibrating acquired spectra for use in spectral analysis includes performing Gaussian peak fitting to spectra acquired by a plurality of NaI detectors to define peak regions. A Na and annihilation doublet may be located among the peak regions. A predetermined energy level may be applied to one of the peaks in the doublet and a location of a hydrogen peak may be predicted based on the location of at least one of the peaks of the doublet. Control systems for calibrating spectra are also disclosed.

20 Claims, 20 Drawing Sheets

FIG. 8

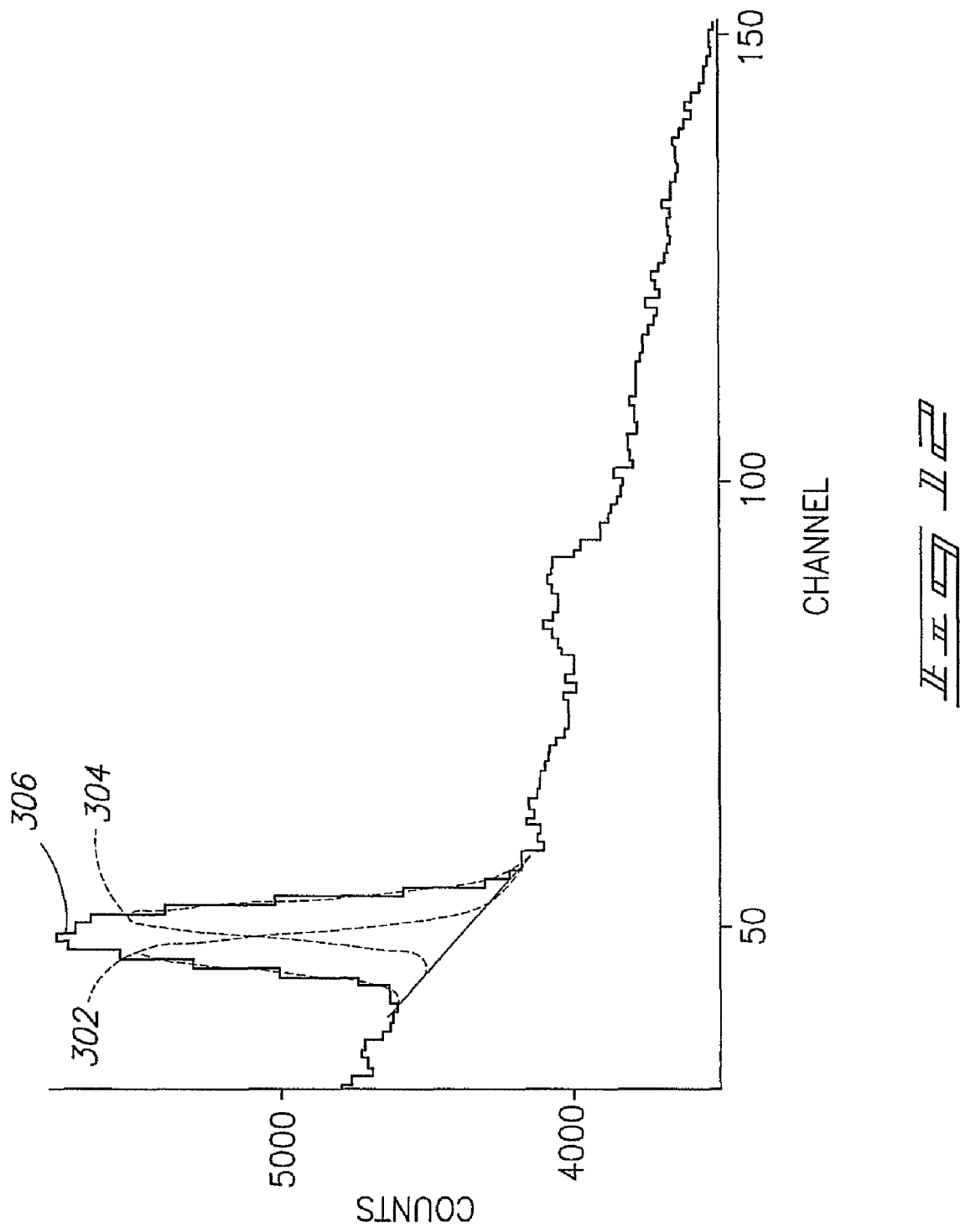

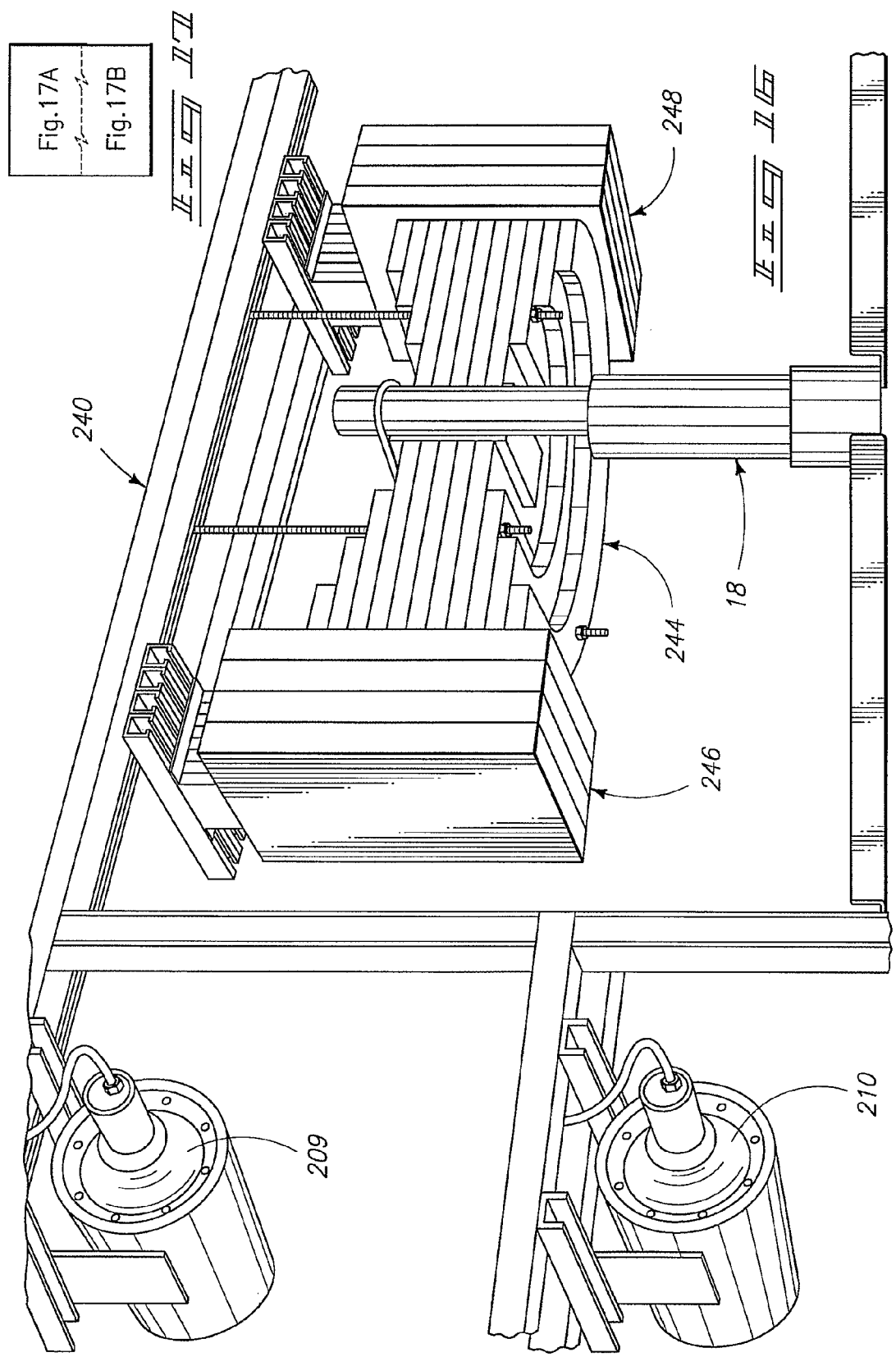

OPERATING PARAMETERS CONFIGURATION

Operation Configuration

[Detectors] [Generators] [Runtime] [Analysis]

DETECTOR PROPERTIES

| Position | Enabled | Serial Number | Name | High Voltage | Gain | LLD |
|---|---|---|---|---|---|---|
| 1 | ☑ | sn117 | Detector 1 | 850 | 0.4 | 24 |
| 2 | ☑ | sn420 | Detector 2 | 895 | 0.4 | 24 |
| 3 | ☑ | sn134 | Detector 3 | 798 | 0.4 | 24 |
| 4 | ☑ | sn406 | Detector 4 | 845 | 0.4 | 24 |
| 5 | ☑ | sn152 | Detector 5 | 855 | 0.4 | 24 |
| 6 | ☑ | sn348 | Detector 6 | 854 | 0.4 | 24 |
| 7 | ☑ | sn371 | Detector 7 | 883 | 0.4 | 24 |
| 8 | ☑ | sn373 | Detector 8 | 849 | 0.4 | 24 |
| 9 | ☑ | sn135 | Detector 9 | 803 | 0.4 | 24 |
| 10 | ☑ | sn386 | Detector 10 | 895 | 0.4 | 24 |
| 11 | ☑ | sn387 | Detector 11 | 826 | 0.4 | 24 |
| 12 | ☑ | sn389 | Detector 12 | 835 | 0.4 | 24 |
| 13 | ☑ | sn391 | Detector 13 | 855 | 0.4 | 24 |
| 14 | ☑ | sn392 | Detector 14 | 836 | 0.4 | 24 |
| 15 | ☑ | sn394 | Detector 15 | 823 | 0.4 | 24 |
| 16 | ☑ | sn395 | Detector 16 | 834 | 0.4 | 24 |

FIG. 17A

| | | | | | |
|---|---|---|---|---|---|
| 17 | ✓ | sn396 | Detector 17 | 838 | 0.4 | 24 |
| 18 | ✓ | sn421 | Detector 18 | 826 | 0.4 | 24 |
| 19 | ✓ | sn399 | Detector 19 | 872 | 0.4 | 24 |
| 20 | ✓ | sn407 | Detector 20 | 810 | 0.4 | 24 |
| 21 | ✓ | sn408 | Detector 21 | 895 | 0.4 | 24 |
| 22 | ✓ | sn409 | Detector 22 | 834 | 0.4 | 24 |
| 23 | ✓ | sn410 | Detector 23 | 835 | 0.4 | 24 |
| 24 | ✓ | sn411 | Detector 24 | 828 | 0.4 | 24 |
| 25 | ✓ | sn374 | Detector 25 | 870 | 0.4 | 24 |
| 26 | ✓ | sn413 | Detector 26 | 880 | 0.4 | 24 |
| 27 | ✓ | sn414 | Detector 27 | 850 | 0.4 | 24 |
| 28 | ✓ | sn415 | Detector 28 | 868 | 0.4 | 24 |
| 29 | ✓ | sn416 | Detector 29 | 855 | 0.4 | 24 |
| 30 | ✓ | sn417 | Detector 30 | 845 | 0.4 | 24 |
| 31 | ✓ | sn419 | Detector 31 | 830 | 0.4 | 24 |
| 32 | ✓ | sn119 | Detector 32 | 795 | 0.4 | 24 |

[APPLY] [CLOSE]

FIG. 17B

Operation Configuration

[Detectors] [Generators] [Runtime] [Analysis]

OPERATING PARAMETERS CONFIGURATION

Generator One (Master)

☑ Enabled

| Field | Value |
|---|---|
| COM Port: | COM 3 ▾ |
| Excitation Range: | 0 |
| Excitation Value: | 50 |
| Repetition Range: | 1 |
| Repetition Value: | 500 |
| Voltage Set Point: | 90 |
| Current Set Point: | 40 |

Generator Two (Slave)

☑ Enabled

| Field | Value |
|---|---|
| COM Port: | COM 4 ▾ |
| Excitation Range: | 0 |
| Excitation Value: | 50 |
| Repetition Range: | 1 |
| Repetition Value: | 500 |
| Voltage Set Point: | 80 |
| Current Set Point: | 45 |

[APPLY] [CLOSE]

FIG. 18

Operation Configuration

OPERATING PARAMETERS CONFIGURATION

[Detectors] [Generators] [Runtime] [Analysis]

Enable/Disable Settings

- ✓ Periodic Analysis [30] (sec)
- ☐ Display Hardware Error Messages
- ☐ Simulation Mode
- ✓ System Logging (Debug)
- ✓ Use Threat Level Settings in Operator GUI
- ✓ Display Generator Status

Runtime Parameters

| | | |
|---|---|---|
| Log File: | c:/leds/log.txt | [...] |
| Data Directory: | c:/leds/ | [...] |
| Minimum Number of Detectors: | 0 | |
| Minimum Number of Generators: | 1 | |
| Maximum Generator Warmup Time: | 100 | |
| Generator Initialization Delay: | 600 | |
| Gain Stabilization Delay: | 120 | (seconds) |
| Progress Bar Dead Time Factor: | 1.2 | |

[APPLY] [CLOSE]

Threat Level Settings

- ● Alpha [300] (runtime) [0.99] (sensitivity)
- ○ Bravo [400] (runtime) [0.99] (sensitivity)
- ○ Charlie [500] (runtime) [0.99] (sensitivity)
- ○ Delta [600] (runtime) [0.99] (sensitivity)

NOTE: Alpha parameters are used when threat levels are disabled.

FIG 19

METHOD AND SYSTEM FOR CALIBRATING ACQUIRED SPECTRA FOR USE IN SPECTRAL ANALYSIS

RELATED APPLICATIONS

This application is a continuation of U.S. patent application Ser. No. 11/877,192, filed Oct. 23, 2007, now U.S. Pat. No. 7,501,637, entitled "METHOD AND SYSTEM FOR DETECTING EXPLOSIVES," now U.S. Pat. No. 7,501,637, issued Mar. 10,2009, which is a divisional of U.S. patent application Ser. No. 11/100,800 filed Apr. 6, 2005, entitled "EXPLOSIVES DETECTION SYSTEM AND METHOD," now U.S. Pat. No. 7,307,256, issued Dec. 11, 2007, the entire subject matter of each of which is incorporated herein by reference.

GOVERNMENT RIGHTS

This invention was made with government support under Contract No. DE-AC07-99ID13727 and Contract No. DE-AC07-05ID14517 awarded by the United States Department of Energy. The government has certain rights in the invention.

TECHNICAL FIELD

The present invention relates to systems and methods for protecting against terrorism. More particularly, the invention relates to systems and methods for detecting explosives.

BACKGROUND OF THE INVENTION

There is a need for an explosive detection system to detect bombs in vehicles of various sizes, from cars to large trucks. When vehicles enter an area, such as a military base, they are inspected visually. They are perhaps inspected by a canine unit, if one is available, and many times they are not available. The inspection time must be short enough so as not to hamper traffic flow.

Currently, vehicles entering facilities such as military bases and embassies are checked for explosives by physical search, x-ray, vapor detection, or canine units.

Attention is directed to the following references: [1] P. C. Womble, G. Vourvopoulos, J. Paschal, I. Novikov, G. Chen, "Nuclear Instruments and Methods in Physics Research," Sect. A Vol. 505, p.p. 470-473 (2003); [2] T. Gozani, M. Elsalim, D. Strellis, D. Brown, "Nuclear Instruments and Methods in Physics Research," Sect. A Vol. 505 p.p. 486-489 (2003); and [3] G. Vourvopoulos, "Chemistry and Industry," p.p. 297-300 (Apr. 18, 1994).

BRIEF DESCRIPTION OF THE DRAWINGS

Preferred embodiments of the invention are described below with reference to the following accompanying drawings.

FIG. 8 is a diagrammatical map illustrating the general locations of detectors.

FIG. 12 is a graph illustrating Gaussian peak fitting to a doublet defined by a sodium peak and an annihilation peak.

FIG. 13 is a graph illustrating Gaussian peak fitting to a hydrogen peak.

FIG. 14 is a graph illustrating Gaussian peak fitting to a sodium 6867 peak.

FIG. 16 illustrates spacing between components in a rack, in one particular embodiment.

FIGS. 17A and 17B comprise a screen view of an example of an administrator level screen using which operating parameters of detectors that can be set.

FIG. 18 is a screen view of an example of an administrator level screen using operating parameters of generators that can be set.

FIG. 19 is a screen view of an example of an administrator level screen using operating parameters such as threat level settings and other items, as shown, that can be set.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The invention provides an explosives detection system and method that detects an explosive inside a vehicle by use of multiple detectors. A combination of detectors is used to detect an explosive in a short amount of time.

Figure 1:
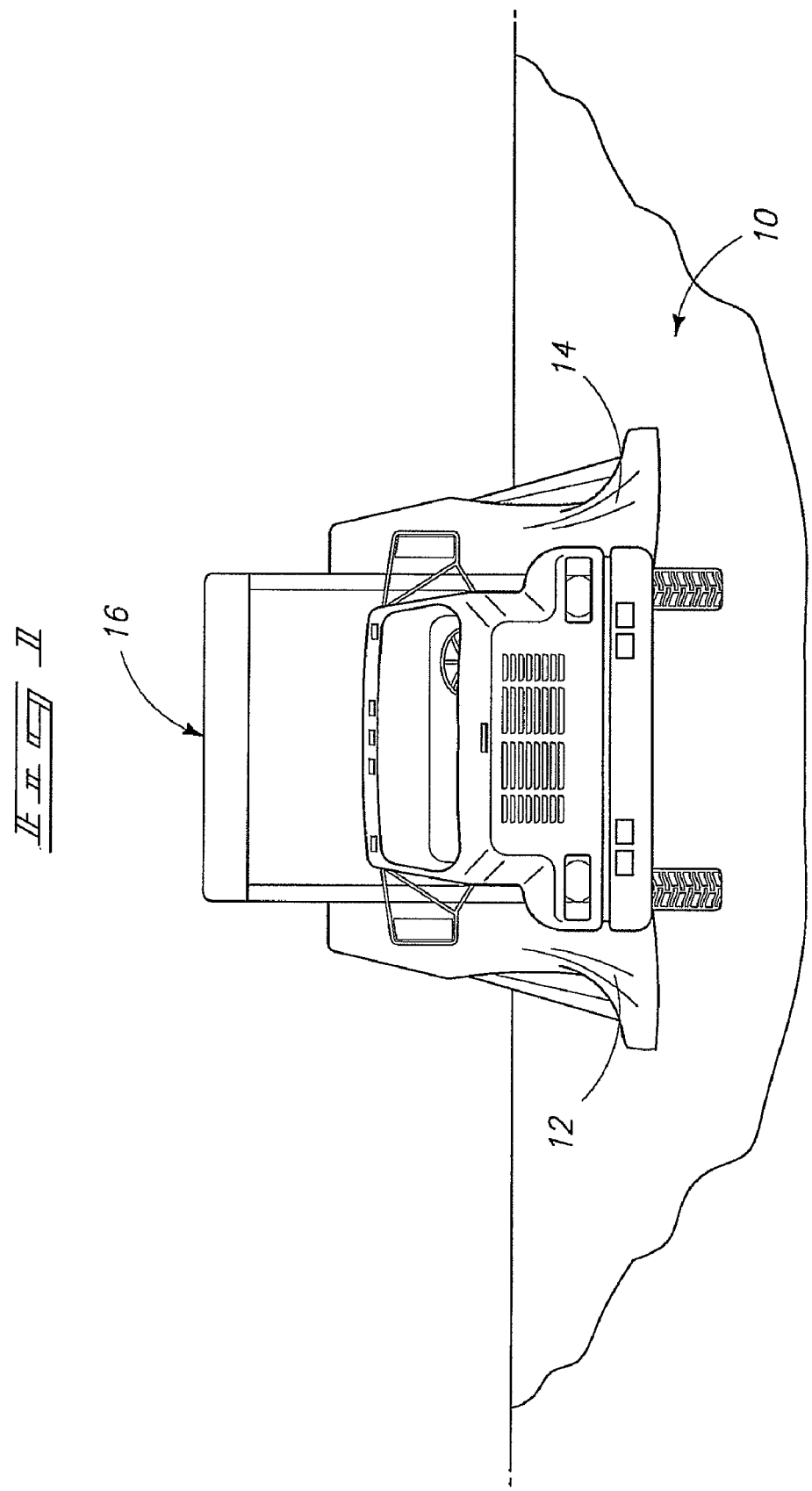
FIG. 1 is a front view of a system embodying various aspects of the invention.
Figure 2:
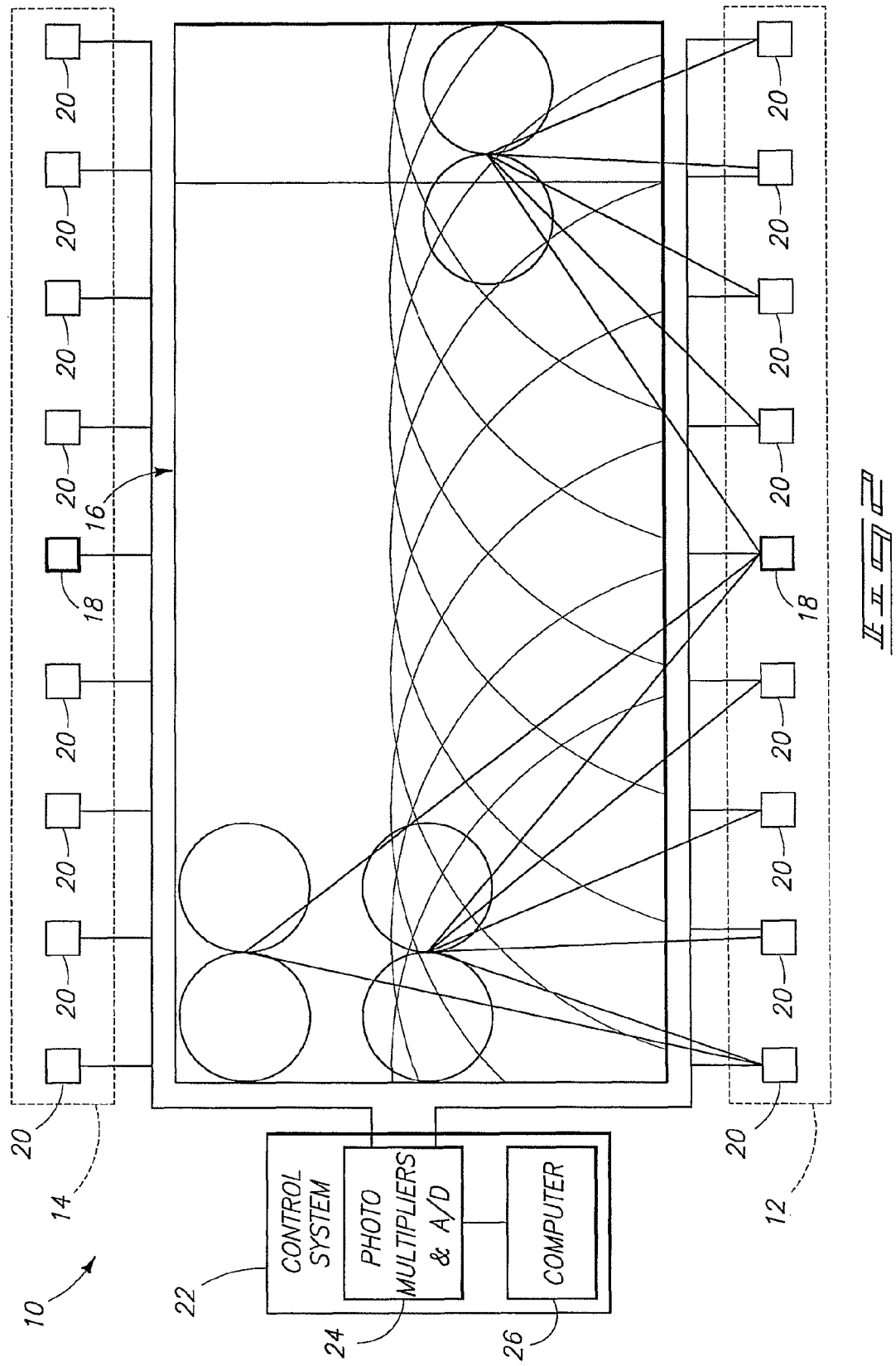
FIG. 2 is a top diagrammatical view of the system of FIG. 1.

FIG. 1 shows a system 10 for detecting explosives, and embodying various aspects of the invention. The system 10 has many anti-terrorism applications including, for example, detecting vehicles carrying explosives, e.g., into restricted areas or military bases. In the illustrated embodiment, the system 10 includes two racks, 12 and 14, capable of being moved to each side of a subject vehicle 16. Each rack 12 and 14 includes a neutron generator 18 and an array of detectors 20, such as NaI detectors (FIG. 2). The two neutron generators 18 are pulsed and synchronized. A controller, which can be defined, for example, by a laptop computer, controls the racks 12 and 14. The control software is easily operable by minimally trained staff. The system 10 was developed to detect explosives in a vehicle within a short time. More particularly, in the illustrated embodiment, the system 10 can detect explosives in a medium size truck within a five-minute measurement time.

In the illustrated embodiment as shown in FIG. 2, the system 10 uses two pulsed D-T neutron generators 18 to interrogate the vehicle 16. In the illustrated embodiment, the neutron generators are Genie 16-C neutron generators available from Sodem, 20 Descartes Avenue, Limeil-Brévannes, France. Other neutron generators could be employed. While other embodiments are possible, in the illustrated embodiment, 14 MeV neutrons are produced. High-energy neutrons penetrate the subject vehicle 16 where they interact with any explosive in or on the vehicle. Some of these neutrons are thermalized within the explosive and are captured by the nitrogen atoms. More particularly, some of the neutrons inelastically scatter off various elements until they eventually thermalize and are captured. These interactions release signature gamma rays from the explosive, which are measured by the large array of NaI detectors 20. Explosives are chemically distinct from innocuous materials. When a neutron is captured by a nitrogen atom, a 10.8 MeV gamma ray is released. The gamma ray spectra, acquired using the detectors 20, are analyzed to identify the major elemental components of the explosives. While other numbers could be employed, in the illustrated embodiment, there are thirty-two NaI 5×5 detectors.

After the detection period is complete, all the spectra from the detectors are automatically calibrated and gain matched to the same linear equation. After this is done, the spectra can be added together. If the detection time is long enough, the detectors do not have to be added and can have enough statistics to indicate detection of explosive(s). The adding of detectors allows for a shorter detection time. The detectors are added together in groups ranging from four to eight detectors. The group members are determined by the closest detectors to any particular point in the suspect vehicle. For example, to detect an explosive located in the far back of the truck, the detectors on both ends of the racks are the closest and will be the most likely to detect the explosives. By having a wide variety of groups, the sensitivity of detection is increased. Also, by not adding all the detectors together, which would include detectors that are out of range of target, the signal to background ratio is kept high. In some embodiments, any one detector does not have enough statistics to conclusively determine whether an explosive is present or not. By adding several detectors together, there will be enough statistics to determine whether an explosive is present or not. The grouping of detectors is selected so as to group together detectors that are a similar distance from a certain spot in the vehicle.

An alarm condition is provided when the system detects certain elements in certain minimum quantities.

In the illustrated embodiment, a control system 22, coupled to the neutron generators 18 and detectors 20, is used to control operation of the neutron generators 18 and process and analyze data received from the detectors 20, and give a result. The control system 22, in various embodiments, may also monitor the health of the system, monitor the interrogation progress, and give a result in a clear, simple, go or no-go format.

In operation, the inspection of a subject vehicle 16 (FIG. 1) begins with the vehicle 16 driving into position between the two identical racks 12 and 14. After the driver exits the vehicle 16 and the radiation exclusion zone, the racks 12 and 14 are moved close to the vehicle. This is referred to as "pinching" the vehicle. In the illustrated embodiment, there is, for example, a 2-mrem-per-hour radiation exclusion zone which is approximately 90 feet long by 60 feet wide. The operator of the system 10 is located outside this zone. In the illustrated embodiment, the operator is up to 4000 feet away. In the illustrated embodiment, each rack 12, 14 includes an array of 5-inch diameter by 5-inch deep sodium iodide (5×5 NaI) detectors, defining the detectors 20, and shielding. After the vehicle 16 is pinched, the neutron generators 18 are turned on and warmed up. After warm-up, the neutron interrogation begins. In the illustrated embodiment, the warm-up time is approximately 85 seconds.

In the illustrated embodiment, the control system 22 includes photomultiplier tube bases 24 and spectrum analyzers for gamma ray spectroscopy. The control system 22 further includes a processor coupled to the photomultipliers 24. More particularly, in the illustrated embodiment, the photomultipliers 24 are defined by digiBASEs® available from Ortec, 801 South Illinois Avenue, Oak Ridge, Tenn. 37830 (see http://www.ortec-online.com/pdf/digibase.pdf). Each digiBASE® also includes an integrated bias supply, preamplifier and digital multi-channel analyzer. In the illustrated embodiment, the processor is defined by a computer 26, such as a portable or laptop computer. More particularly, in the illustrated embodiment, all the digiBASEs® are connected to the control laptop computer 26 by USB cables through USB hubs, which provide power to the photomultipliers 24. In the illustrated embodiment, the only other connection on the digiBASE® is a gating input. Data are collected and stored by the digiBASEs® during the interrogation. Periodically during the interrogation the stored data are read from all the digiBASEs® at a USB rate. Because the data are read in spectrum form from the digiBASEs®, the speed of the USB is not crucial. Alternative connection types and alternatives to digiBASEs® could also be employed.

When the interrogation is complete, a spectrum is read from each detector 20. The spectra are then calibrated. In the illustrated embodiment, the calibration is automatic, and is accomplished, for example, by using always-present gamma rays including Hydrogen at 2.2 MeV. Spectra with calibration coefficients outside preset ranges are rejected and not analyzed. After the initial individual calibration occurs, spectra are shifted to one common calibration, which allows the spectra to be added together. Calibration is described in greater detail below. The spectra are then analyzed for signature gamma rays. Depending on the results of the analysis, the operator is alerted with an "All Clear" message indicating no explosives detected or a "Suspect Cargo" message indicating that explosives were detected. In the illustrated embodiment, a simple, very clear go or no-go output is displayed that can be easily understood by an operator without the operator needing to reach his or her own conclusion or needing to analyze results. At an administrator-defined interval during the interrogation, preliminary results can be given. The entire interrogation and analysis time, including the neutron generator warm-up time, is less than 300 seconds (five minutes), in the illustrated embodiment.

In some embodiments, the system 10 includes a feature that allows the operator to change the sensitivity of the system 10 in response to changes in facility alert status. In some embodiments, the desired sensitivity is selected by choosing one of multiple threat levels (e.g., Alpha, Bravo, Charlie, or Delta). Each level corresponds to a different balance of count time, false positive and false negative rates.

In the illustrated embodiment, one of the design considerations for the system 10 was to maximize the signal-to-noise ratio. To maximize the signal, highly efficient 5×5 NaI detectors with factory quoted resolutions ranging from 6.5% to 7.4% using a 137Cs source were chosen. A disadvantage of the NaI detectors is that their gain changes with neutron activation. This is counteracted by the gain stabilizer built into the digiBASE® and by the calibration steps described below in greater detail. Gain changes of the NaI detectors due to temperature are much less significant than due to the neutron activation, and are also minimized because material surrounding the detectors reduces the temperature fluctuations.

In the illustrated embodiment, the detectors 20 are distributed over the length of a typical mid-size delivery truck. In the illustrated embodiment, on each side of the subject vehicle 16, there are sixteen detectors plus a neutron generator 18 distributed over about 16.5 feet with the detectors 20 in two rows spaced apart. This arrangement means there will be a detector close to the explosives no matter where they are located in the subject vehicle 16. Other spacings are possible. In the illustrated embodiment, the arrangement of the detectors 20 was selected to be able to cover the entire cargo area of a mid-sized truck (up to 20 ft). But there is a distance limit from the neutron generators 18 where the neutron flux drops off to a level that doesn't allow enough production of nitrogen gamma rays to be detected. The detectors 20 should also be close enough to each other so that they can be summed together so that a statistically significant amount of nitrogen can be detected.

Signal strength can be further improved by raising the flux of neutrons interrogating the vehicle. Adding more neutron generators or using higher flux neutron generators can achieve this. Both of these options are costly. The addition of a neutron generator would raise the cost of a system significantly and running a neutron generator at a higher neutron flux output would reduce the lifetime of the neutron generator tube, increasing maintenance costs.

Another way of increasing the signal-to-noise ratio is to reduce the background seen by the detectors. In the illustrated embodiment, a shielding configuration is provided that blocks the detectors from neutrons from the generators as well as unwanted gamma rays produced from surrounding materials. This shielding reduces the neutron flux on the detectors as well as the radiation footprint of the system.

In the illustrated embodiment, there are two shielding configurations. One configuration shields the neutron generators 18 from the detectors 20, and another shields the detectors 20 from as much background as is possible.

The shielding around the neutron generators 18 includes, for example, 12 inches of 5% borated poly, which reduces the neutron flux from the neutron generators 18 by as much as 90%. The neutrons interacting with the poly create a large amount of 2.2 MeV gamma rays.

Figure 15:
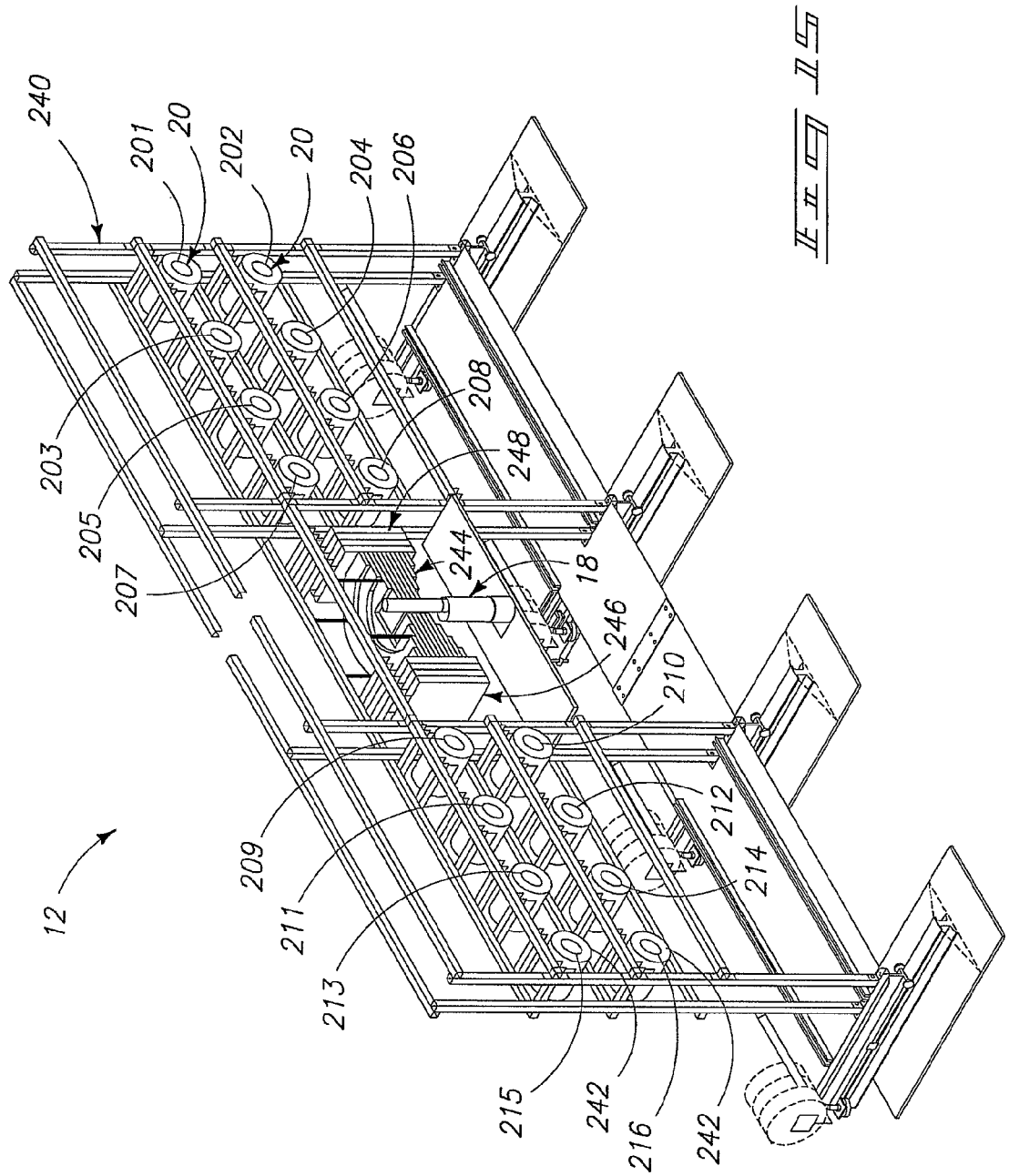
FIG. 15 is a cut-away perspective view of one of the racks.

In the illustrated embodiment, 4 inches of additional bismuth shielding is placed between the poly and the detectors 20 to reduce this flux of gamma rays. The shielding around the sides of the detectors 20 includes, for example, 1 inch of bismuth. This reduces the unwanted gamma rays from any interaction the neutrons have with the surrounding material. FIG. 15 is a cut-away perspective view of one of the racks and shows the shielding.

In the illustrated embodiment, the control system 22 has a graphical user interface defined by the computer 26. The graphical user interface provides different screens for different levels of users. For example, in the illustrated embodiment, the system has two levels of users, operator and administrator. An operator is, for example, allowed to check the status/health of the system and, of course, run the system. The administrator sets up the system originally and has control over all preferences and settings.

Figure 3:
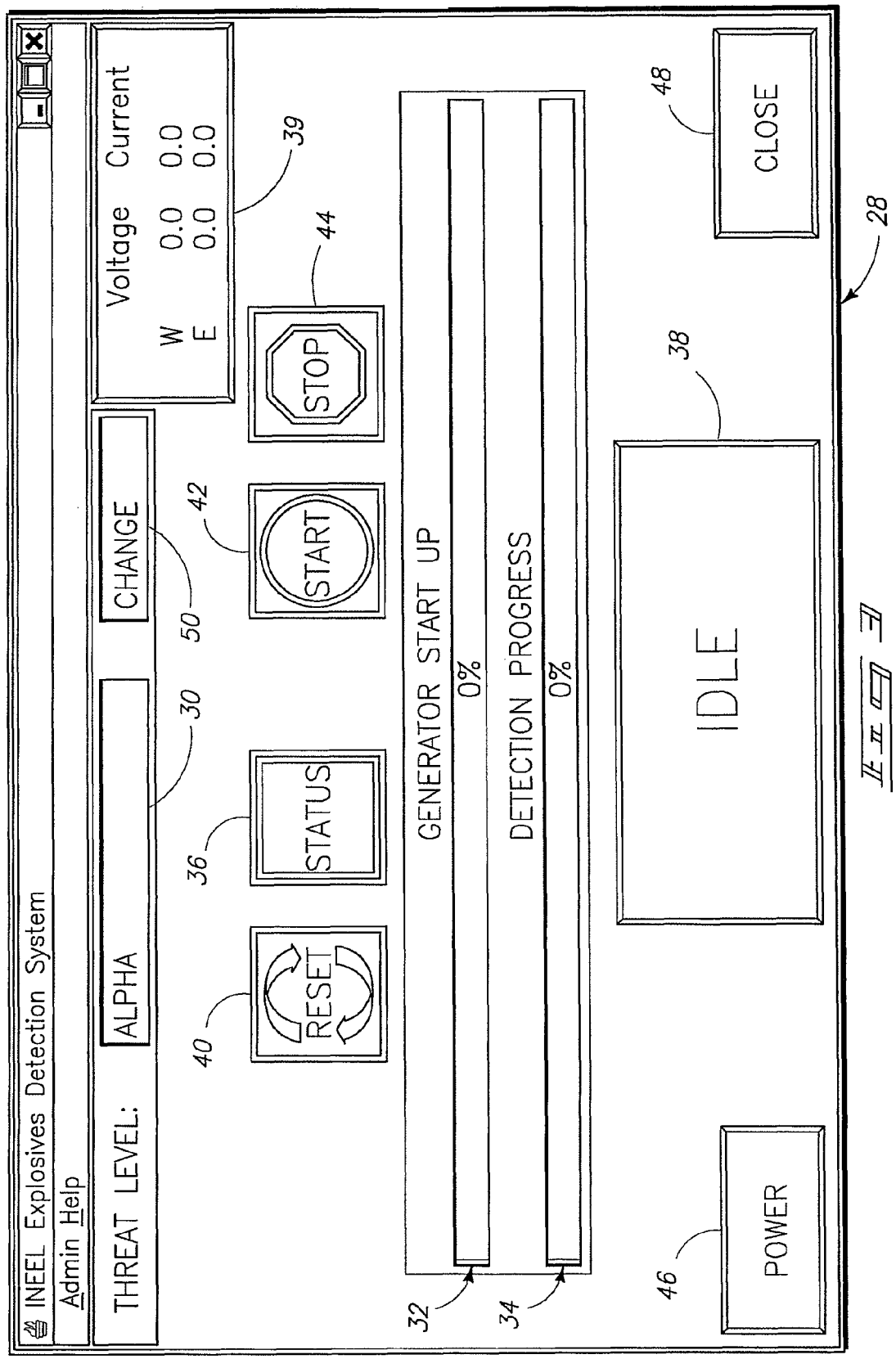
FIG. 3 is a screen shot of a graphical user interface of the system of FIG. 1.

FIG. 3 shows but one example of a main graphical user interface (GUI) screen 28, which the operator would see after the system 10 is first powered on. The screen 28 was intentionally simplified, allowing the operator to quickly determine the status of the system 10. The screen 28 indicates, in an area 30, the threat level. The screen 28 indicates, in areas 32 and 34, the progress of the interrogation. The screen 28 indicates, in an area 36, status. The screen 28 also indicates, in an area 39, the voltages and currents for two neutron generators 18. The status area or button 36 displays the health of the system using colors for example, green indicates that the computer 26 is communicating with all detectors 20 and neutron generators 18, yellow indicates loss of connection with at least one detector 20, and red indicates loss of communication with at least a threshold number of detectors 20. The administrator of the system sets this threshold. The system has the ability to operate even with the loss of detectors 20 but must have at least a threshold amount. The screen 28 indicates results in an area 38. Area 38 will display one of the following: Idle, Interrogating, Processing, All Clear, or Suspect Cargo. If, at any time, the computer 26 loses communication with the neutron generators 18 for more than a predetermined amount of time, such as a few seconds, the neutron generators 18 will shut down. Also, as a fail-safe, if the system 10 takes longer than a predetermined amount of time for an interrogation, the neutron generators 18, and possibly other parts of the system 10, will shutdown. The screen 28 also includes a reset button 40, which causes the screen 28 to refresh; a start button 42, for starting an interrogation; a stop button 44, for terminating an interrogation; a power button 46, for turning power on to the detectors 20 and neutron generators 18 by setting their various parameters, and a close button 48, for closing the graphical user interface screen 28 and allowing the computer 26 to be used as a conventional computer. The screen 28 also includes a change button 50 that allows the Threat Level to be changed.

Figure 4:
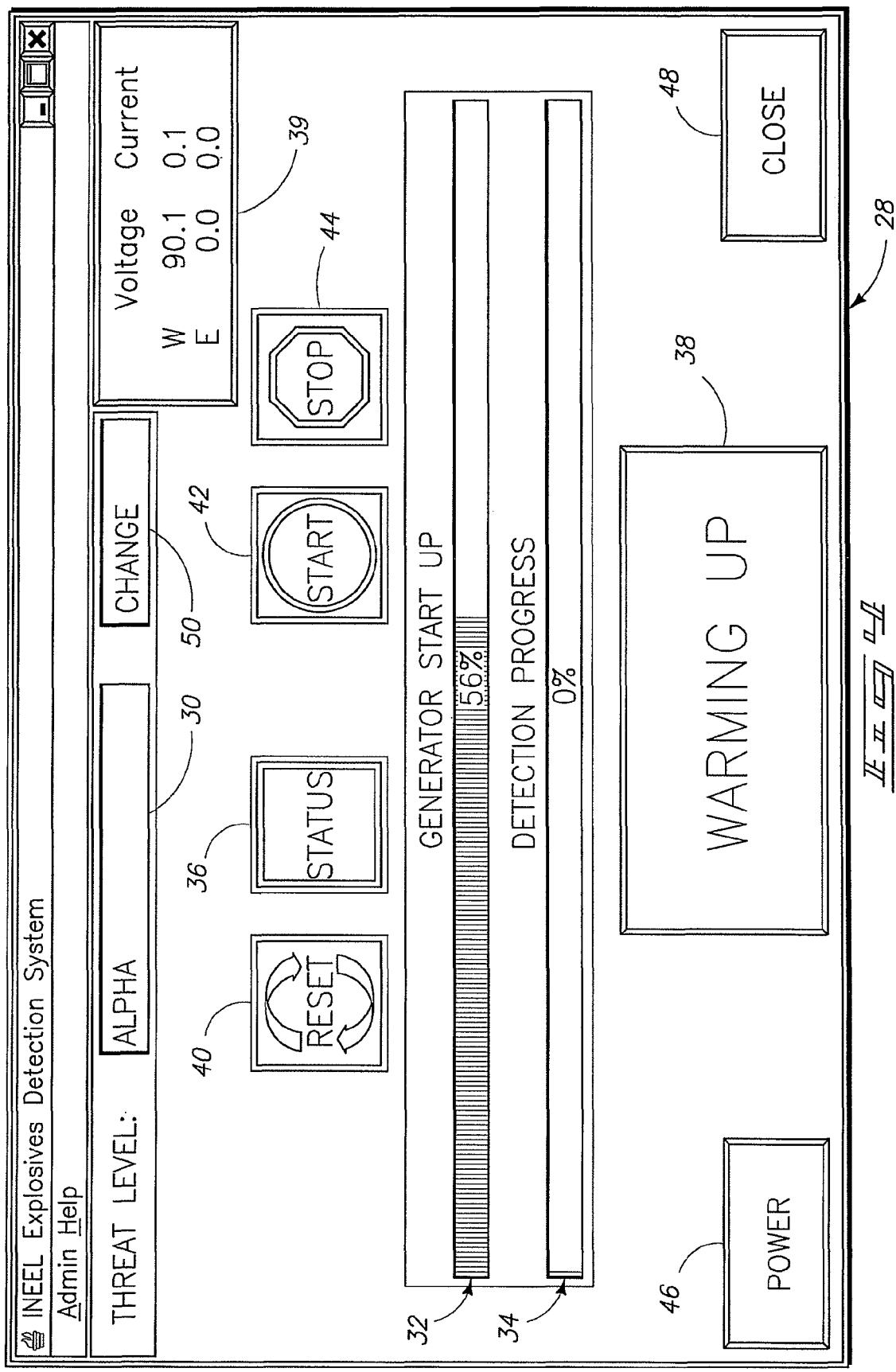
FIG. 4 is a screen shot of the graphical user interface of FIG. 3 during the process of neutron generator start-up.

FIG. 4 is a screen shot of the graphical user interface screen 28 during neutron generator start-up (during warm-up).

Figure 5:
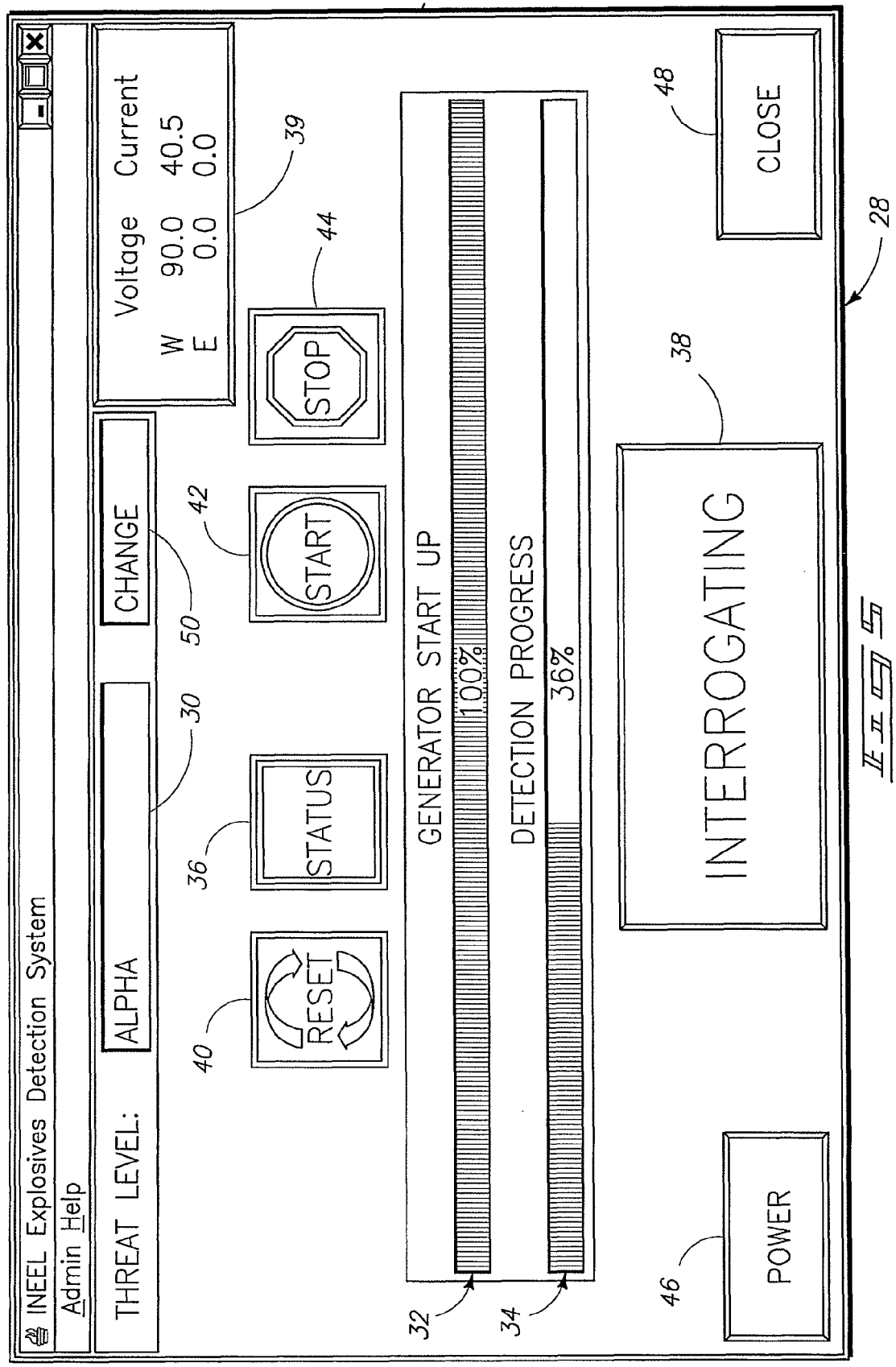
FIG. 5 is a screen shot of the graphical user interface of FIG. 3 during the process of interrogation.

FIG. 5 is a screen shot of the graphical user interface screen 28 during detection using the detectors 20 (FIG. 2).

Figure 6:
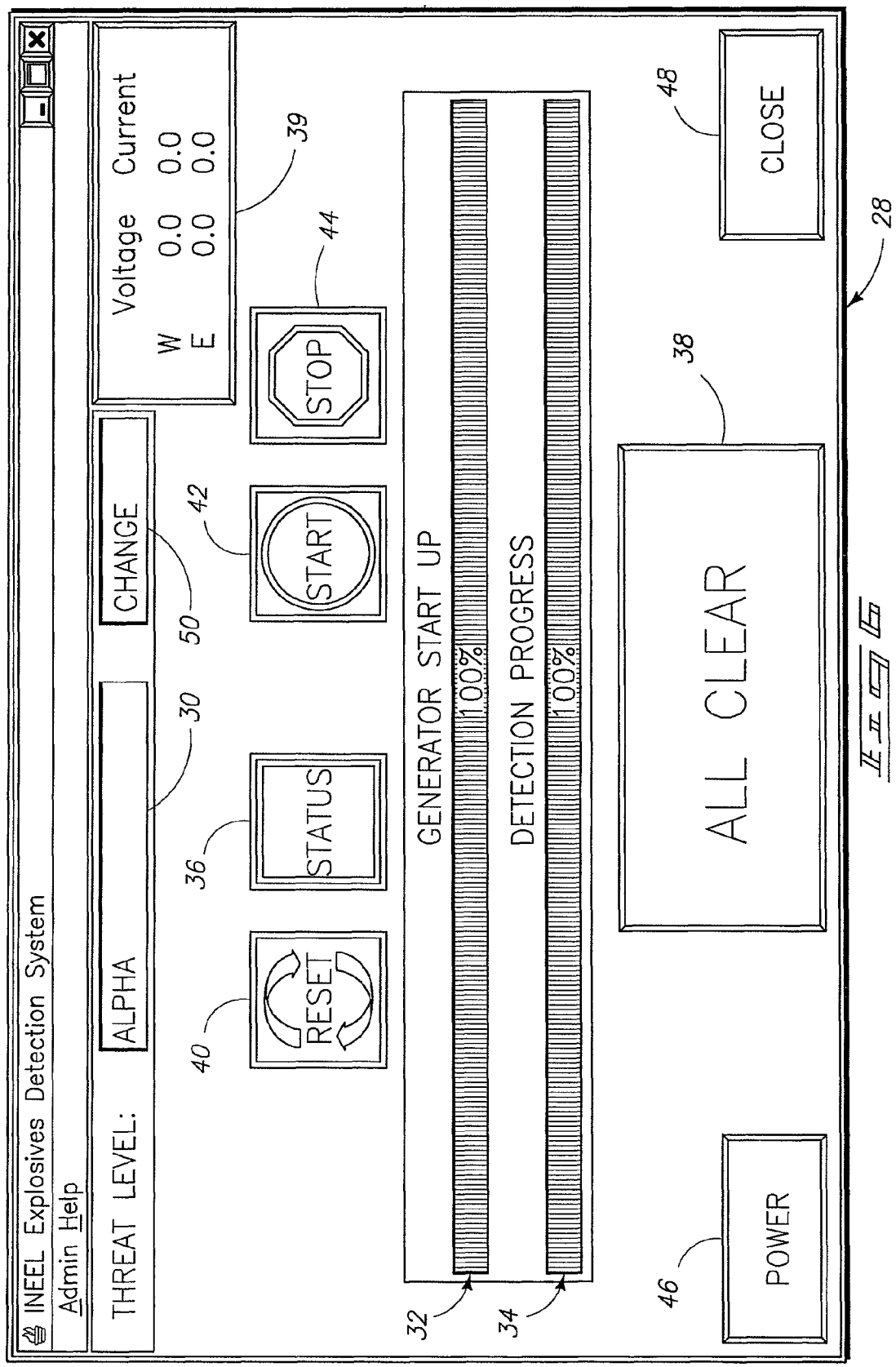
FIG. 6 is a screen shot of the graphical user interface of FIG. 3 after a determination that no explosives are present.

FIG. 6 is a screen shot of the graphical user interface screen 28 after detection using the detectors 20, where no explosives have been detected. "All Clear" is displayed in area 38.

Figure 7:
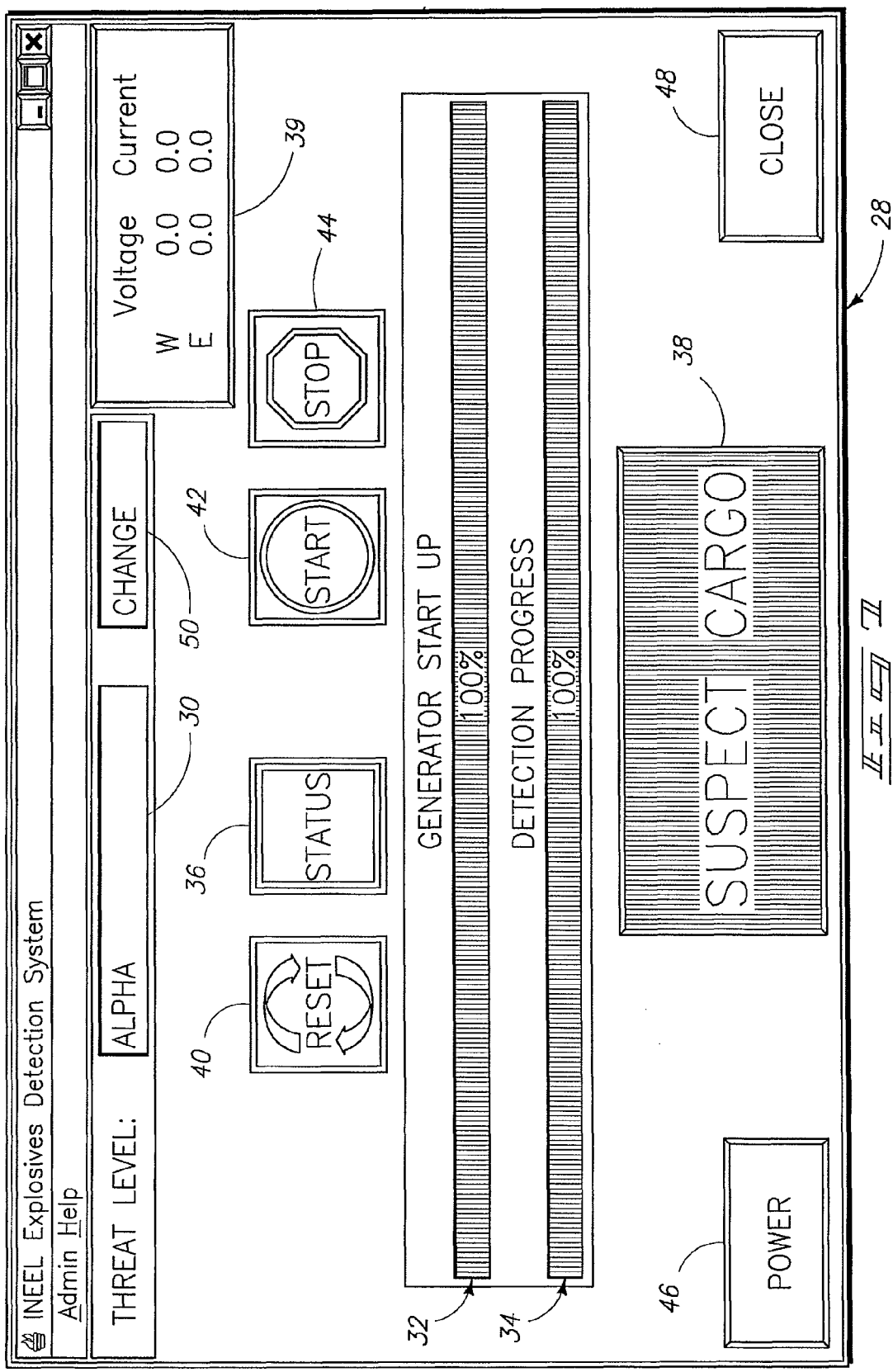
FIG. 7 is a screen shot of the graphical user interface of FIG. 3 after a determination that explosives are present.

FIG. 7 is a screen shot of the graphical user interface screen 28 after detection using the detectors 20, where explosives have been detected. "Suspect Cargo" is displayed in area 38.

FIGS. 17A and 17B comprise is a screen view of an example of an administrator level screen using operating parameters of detectors that can be set.

FIG. 18 is a screen view of an example of an administrator level screen using which operating parameters of generators can be set.

FIG. 19 is a screen view of an example of an administrator level screen using which operating parameters such as threat level settings and other items, as shown, that can be set.

Figure 8:
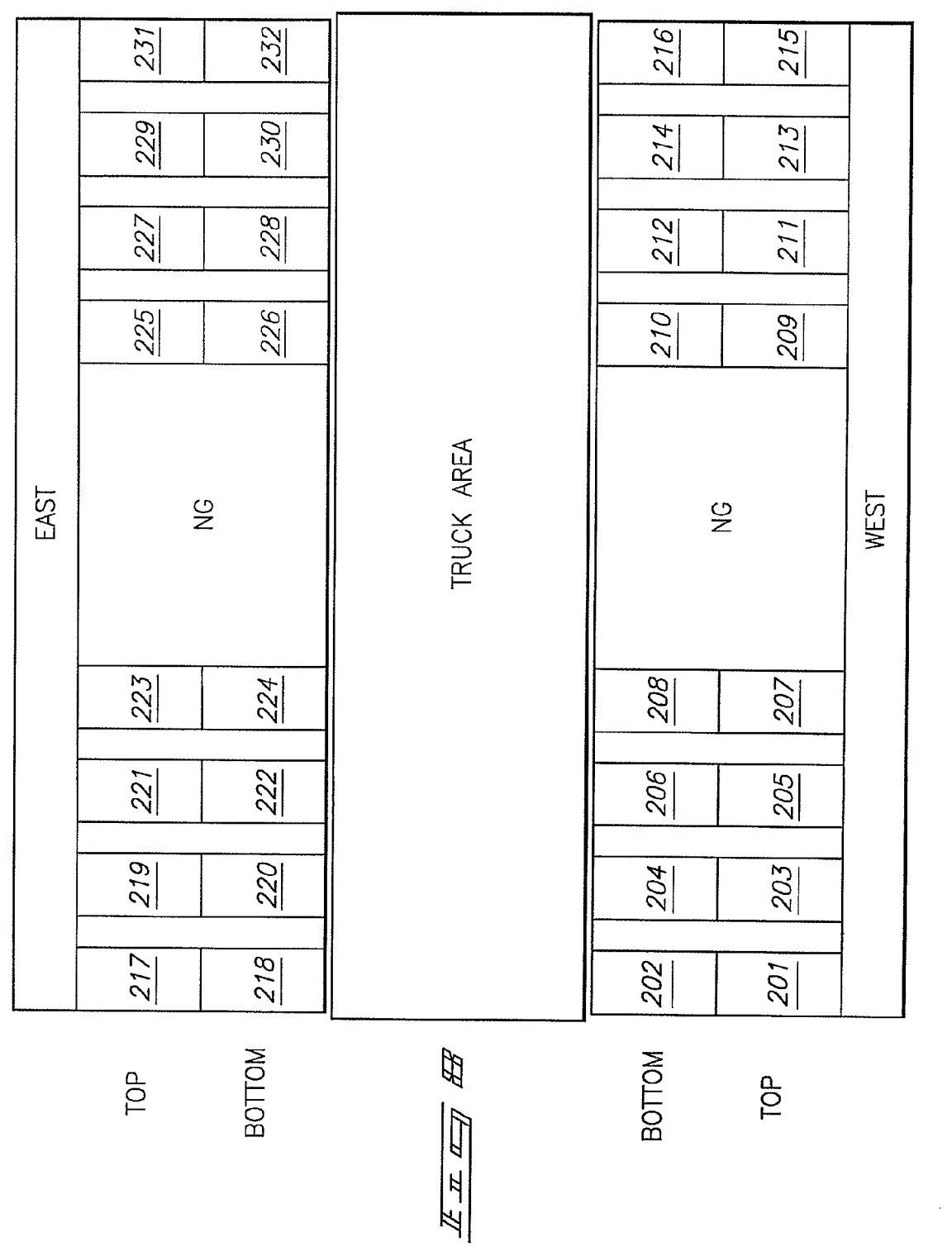

FIG. 8 is a diagrammatical map illustrating the general locations of detectors. By grouping multiple detectors together, the system is able to detect smaller quantities in a shorter amount of time. Also, because of the way the detectors are grouped, the detectors are able to interrogate an entire 20-foot truck. While other groupings are possible, in the illustrated embodiment, groups are defined as follows, each detector 20 being more particularly numbered as shown in FIG. 8:

Group 1 includes detectors 201, 202, 203, 204, 205, and 206;

Group 2 includes detectors 203, 204, 205, 206, 207, and 208;

Group 3 includes detectors 205, 206, 207, 208, 209, and 210;

Group 4 includes detectors 207, 208, 209, 210, 211, and 212;

Group 5 includes detectors 209, 210, 211, 212, 213, and 214;

Group 6 includes detectors 211, 212, 213, 214, 215, and 216;

Group 7 includes detectors 217, 218, 219, 220, 221, and 222;

Group 8 includes detectors 219, 220, 221, 222, 223, and 224;

Group 9 includes detectors 221, 222, 223, 224, 225, and 226;

Group 10 includes detectors 223, 224, 225, 226, 227, and 228;

Group 11 includes detectors 225, 226, 227, 228, 229, and 230;

Group 12 includes detectors 227, 228, 229, 230, 231, and 232;

Group 13 includes detectors 201, 203, 205, and 207;

Group 14 includes detectors 203, 205, 207, and 209;

Group 15 includes detectors 205, 207, 209, and 211;

Group 16 includes detectors 207, 209, 211, and 213;

Group 17 includes detectors 209, 211, 213, and 215;

Group 18 includes detectors 202, 214, 216, and 218;

Group 19 includes detectors 204, 206, 208, and 210;

Group 20 includes detectors 206, 208, 210, and 212;

Group 21 includes detectors 208, 210, 212, and 214;

Group 22 includes detectors 210, 212, 214, and 216;

Group 23 includes detectors 217, 219, 221, and 223;

Group 24 includes detectors 219, 221, 223, and 225;

Group 25 includes detectors 221, 223, 225, and 227;

Group 26 includes detectors 223, 225, 227, and 229;

Group 27 includes detectors 225, 227, 229, and 231;

Group 28 includes detectors 218, 220, 222, and 224;

Group 29 includes detectors 220, 222, 224, and 226;

Group 30 includes detectors 222, 224, 226, and 228;

Group 31 includes detectors 224, 226, 228, and 230;

Group 32 includes detectors 226, 228, 230, and 232;

Group 33 includes detectors 201, 202, 203, and 204;

Group 34 includes detectors 203, 204, 205, and 206;

Group 35 includes detectors 205, 206, 207, and 208;

Group 36 includes detectors 207, 208, 209, and 210;

Group 37 includes detectors 209, 210, 211, and 212;

Group 38 includes detectors 211, 212, 213, and 214;

Group 39 includes detectors 213, 214, 215, and 216;

Group 40 includes detectors 217, 218, 219, and 220;

Group 41 includes detectors 219, 220, 221, and 222;

Group 42 includes detectors 221, 222, 223, and 224;

Group 43 includes detectors 223, 224, 225, and 226;

Group 44 includes detectors 225, 226, 227, and 228;

Group 45 includes detectors 227, 228, 229, and 230;

Group 46 includes detectors 229, 230, 231, and 232;

Group 47 includes detectors 201, 203, 205, 217, 219, and 221;

Group 48 includes detectors 203, 205, 207, 219, 221, and 223;

Group 49 includes detectors 205, 207, 209, 221, 223, and 225;

Group 50 includes detectors 207, 209, 211, 223, 225, and 227;

Group 51 includes detectors 209, 211, 213, 225, 227, and 229;

Group 52 includes detectors 211, 213, 215, 227, 229, and 231;

Group 53 includes detectors 202, 204, 206, 218, 220, and 222;

Group 54 includes detectors 204, 206, 208, 220, 222, 224;

Group 55 includes detectors 206, 208, 210, 222, 224, and 226;

Group 56 includes detectors 208, 210, 212, 224, 226, and 228;

Group 57 includes detectors 210, 212, 214, 226, 228, and 230;

Group 58 includes detectors 212, 214, 216, 228, 230, and 232;

Group 59 includes detectors 201, 202, 203, 204, 205, 206, 207, and 208;

Group 60 includes detectors 203, 204, 205, 206, 207, 208, 209, and 210;

Group 61 includes detectors 205, 206, 207, 208, 209, 210, 211, and 212;

Group 62 includes detectors 207, 208, 209, 210, 211, 212, 213, and 214;

Group 63 includes detectors 209, 210, 211, 212, 213, 214, 215, and 216;

Group 64 includes detectors 217, 218, 219, 220, 221, 222, 223, and 224;

Group 65 includes detectors 219, 220, 221, 222, 223, 224, 225, and 226;

Group 66 includes detectors 212, 222, 223, 224, 225, 226, 227, and 228;

Group 67 includes detectors 223, 224, 225, 226, 227, 228, 229, and 230;

Group 68 includes detectors 225, 226, 227, 228, 229, 230, 231, and 232;

Group 69 includes detectors 201, 202, 217, and 218;

Group 70 includes detectors 201, 202, 203, 204, 217, 218, 219, and 220;

Group 71 includes detectors 215, 216, 231, and 232;

Group 72 includes detectors 213, 214, 215, 216, 229, 230, 231, and 232;

Group 73 includes detectors 214, 215, 216, 230, 231, and 232;

Group 74 includes detectors 213, 215, 216, 229, 231, and 232;

Group 75 includes detectors 213, 214, 216, 229, 230, and 232;

Group 76 includes detectors 213, 214, 215, 229, 230, and 231;

Group 77 includes detectors 201, 202, 203, 217, 218, and 219;

Group 78 includes detectors 201, 202, 204, 217, 218, and 220;

Group 79 includes detectors 201, 203, 204, 217, 219, and 220; and Group 80 includes detectors 202, 203, 204, 218, 219, and 220.

Other groupings, either overlapping or not overlapping, can be used in alternative embodiments. An advantage of this grouping of detectors is the ability to detect smaller quantities in a shorter amount of time.

Figure 9:
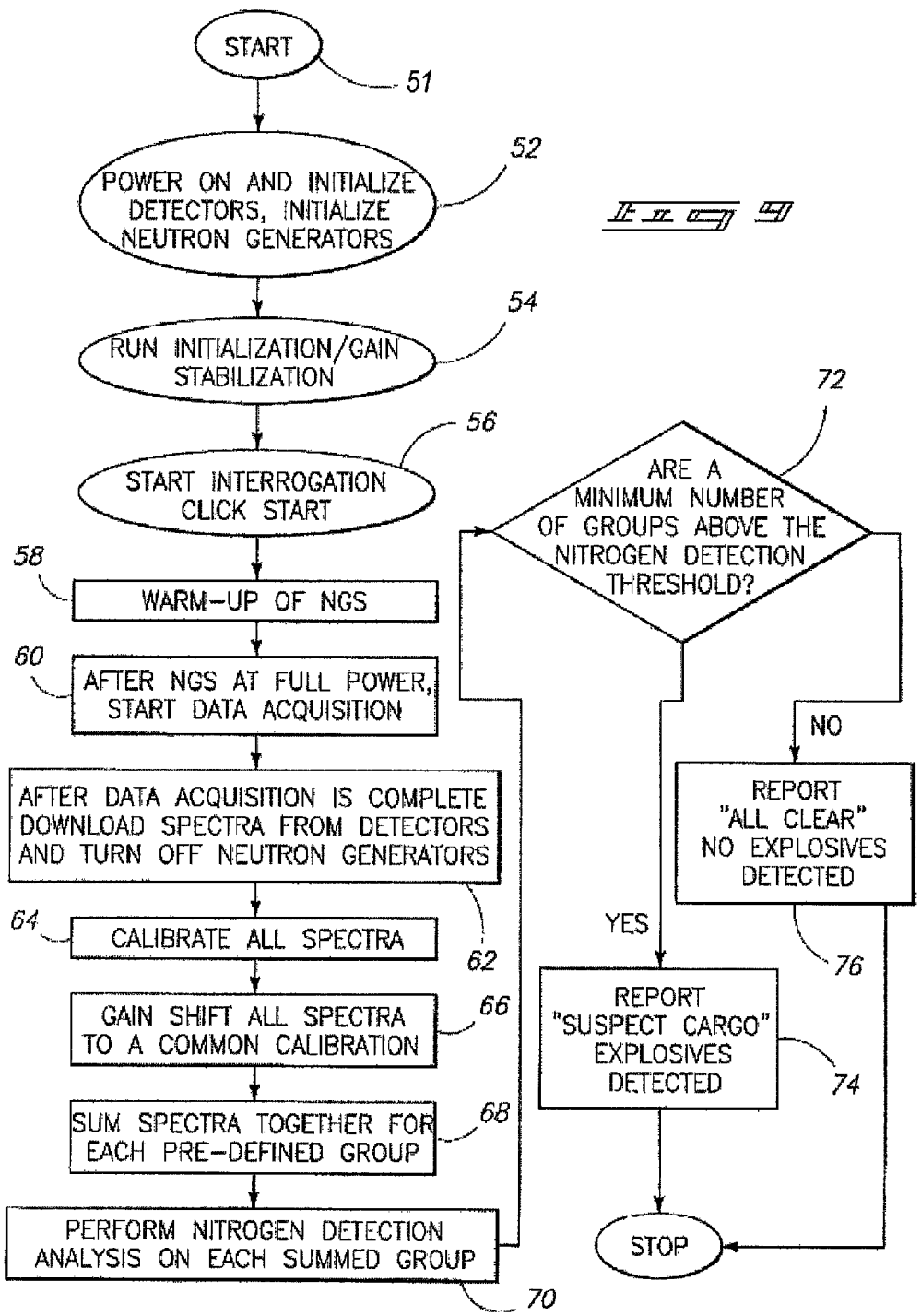
FIG. 9 is a high level flowchart illustrating logic implemented by the control system.

FIG. 9 is a flowchart illustrating operation of the control system 22, in accordance with various embodiments.

Figure 10:
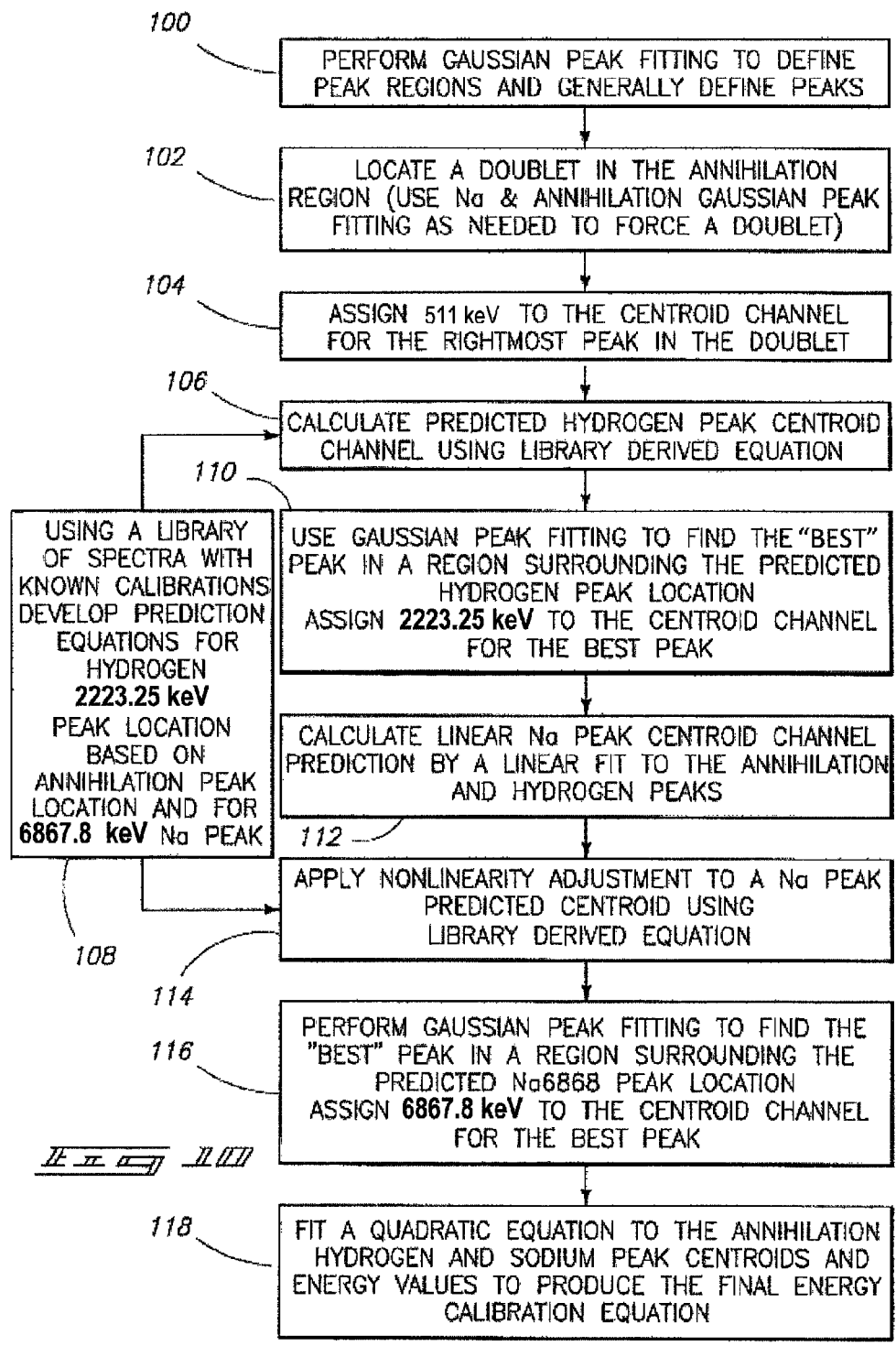
FIG. 10 is a flowchart illustrating calibration of FIG. 9 in greater detail.

FIG. 10 is a flowchart illustrating the calibration of FIG. 9 in greater detail.

As depicted in FIG. 9, in step 51, operation starts.

In step 52, after the power button 46 is clicked, detectors 20 are powered on, and neutron generators 18 are initialized. After performing step 52, the controller proceeds to step 54.

In step 54, an initialization or gain/stabilization run is performed. The detectors are activated by neutrons, and in this step, they are activated. Spectra tend to shift, and it is desired to stabilize them. In the illustrated embodiment, gain stabilization is a feature of the digiBASEs®. Gain stabilization means finding a peak and providing the location and width of the peak to the digiBASE® so that the digiBASE® can keep that peak from shifting (e.g., along the horizontal axis in any of FIGS. 11-14). Gain stabilization could also be performed if digiBASEs® are not employed. In the illustrated embodiment, after the gain stabilization is complete, the reset button 40 must be pressed before proceeding. After performing step 54, the controller proceeds to step 56.

In step 56, the controller waits for the start button 42 to be pressed. After the start button 42 is pushed, the interrogation starts. After performing step 56, the controller proceeds to step 58.

In step 58, warm-up of the neutron generators 18 is initiated. In the illustrated embodiment, this takes about 85 seconds, other neutron generators are warmed up more quickly. During warm-up, voltage is on and current comes up, and pressure in tubes in the neutron generators increases. After performing step 58, the controller proceeds to step 60.

In step 60, after the neutron generators have reached full power and are emitting neutrons, data acquisition is started, using the detectors 20. After performing step 60, the controller proceeds to step 62.

In step 62, after the data acquisition is complete, spectra are downloaded from the detectors 20 and the neutron generators 18 are turned off. After performing step 62, the controller proceeds to step 64.

In step 64, the spectra are calibrated. This step is described in greater detail below in connection with FIG. 10. After performing step 64, the controller proceeds to step 66.

In step 66, spectra are gain shifted to a common calibration. This refers to moving peaks to common channels or energy levels so they can be added. The term "channel" refers to the horizontal axis in any of FIGS. 11-14. Different positions along the horizontal axis are different channels having different energy levels (energy level increases as you move to the right of the origin). Because of potential drift, it is not always known, at first, which channel corresponds to which energy level. Calibration is performed, as shown in FIG. 9, to determine which channels correspond to which energy levels.

After performing step 66, the controller proceeds to step 68.

In step 68, all spectra are summed together for each predefined group. The summing is performed for each of the groups 1 through 80, described above in connection with FIG. 8. After performing step 68, the controller proceeds to step 70.

In step 70, nitrogen detection analysis is performed on each summed group. This refers to identifying a nitrogen region, and performing statistical analysis to determine if counts are above a background level in a region approximately 100 channels wide near 10.8 MeV. There are actually three overlapping peaks, which may not be distinguishable, so a range of channels is analyzed. After performing step 70, the controller proceeds to step 72.

In step 72, a determination is made as to whether a minimum number of groups are above the nitrogen detection threshold. The minimum number of groups may be three, for example. If so, the controller proceeds to step 74. If not, the controller proceeds to step 76.

In step 74, the controller informs the operator that explosives have been detected, by, for example, causing a message such as "Suspect Cargo" to be displayed. In alternative embodiments, an audible message is provided in addition to, or instead of, the display.

In step 76, the controller informs the operator that explosives have not been detected, by, for example, causing a message such as "All Clear" to be displayed. In alternative embodiments, an audible message is provided in addition to, or instead of, the display.

FIG. 10 describes step 64 in greater detail.

Figure 11:
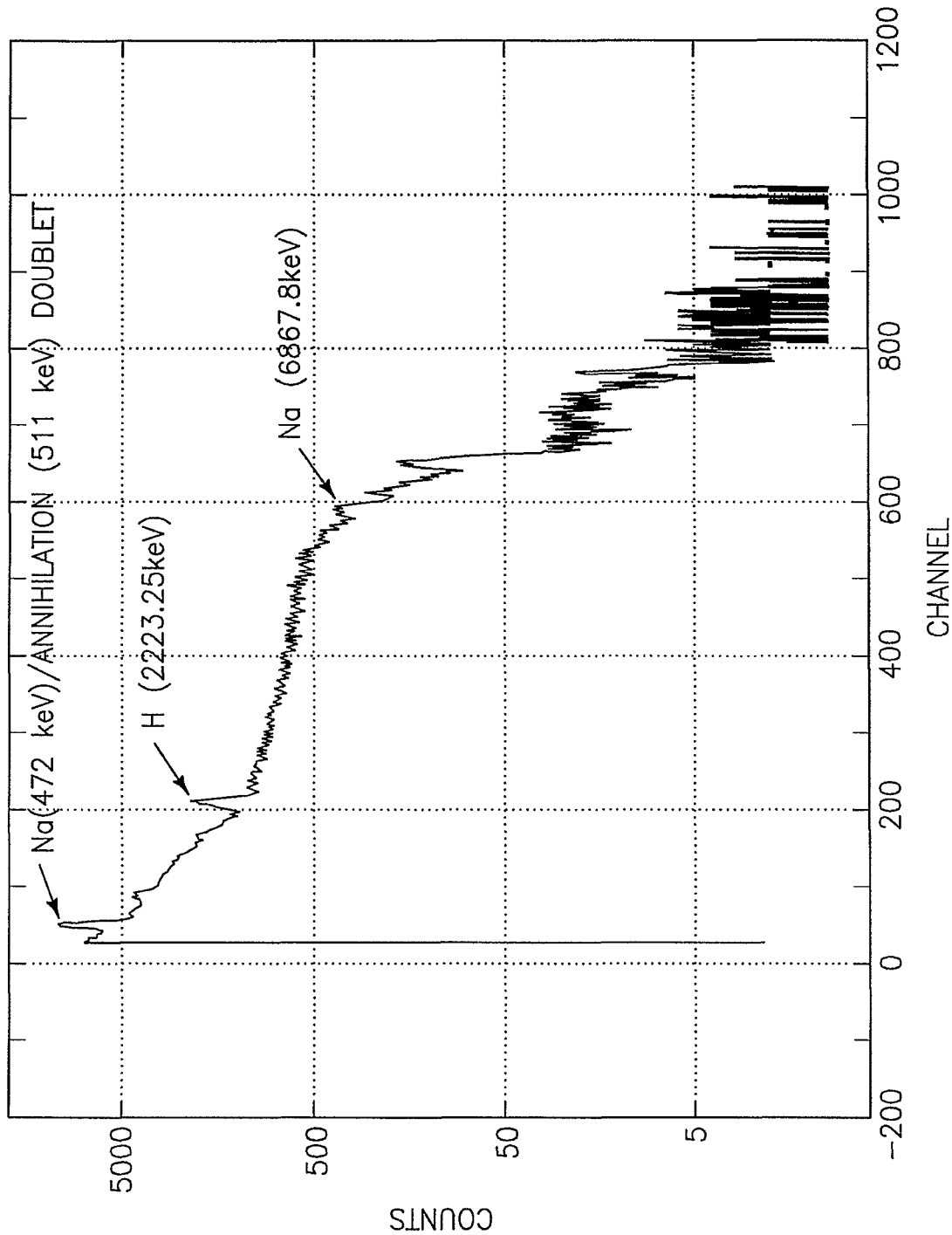
FIG. 11 is graph showing an example of a typical NaI spectrum, which includes a Na/Annihilation doublet, a Hydrogen peak, and a Na peak.
Figure 11:
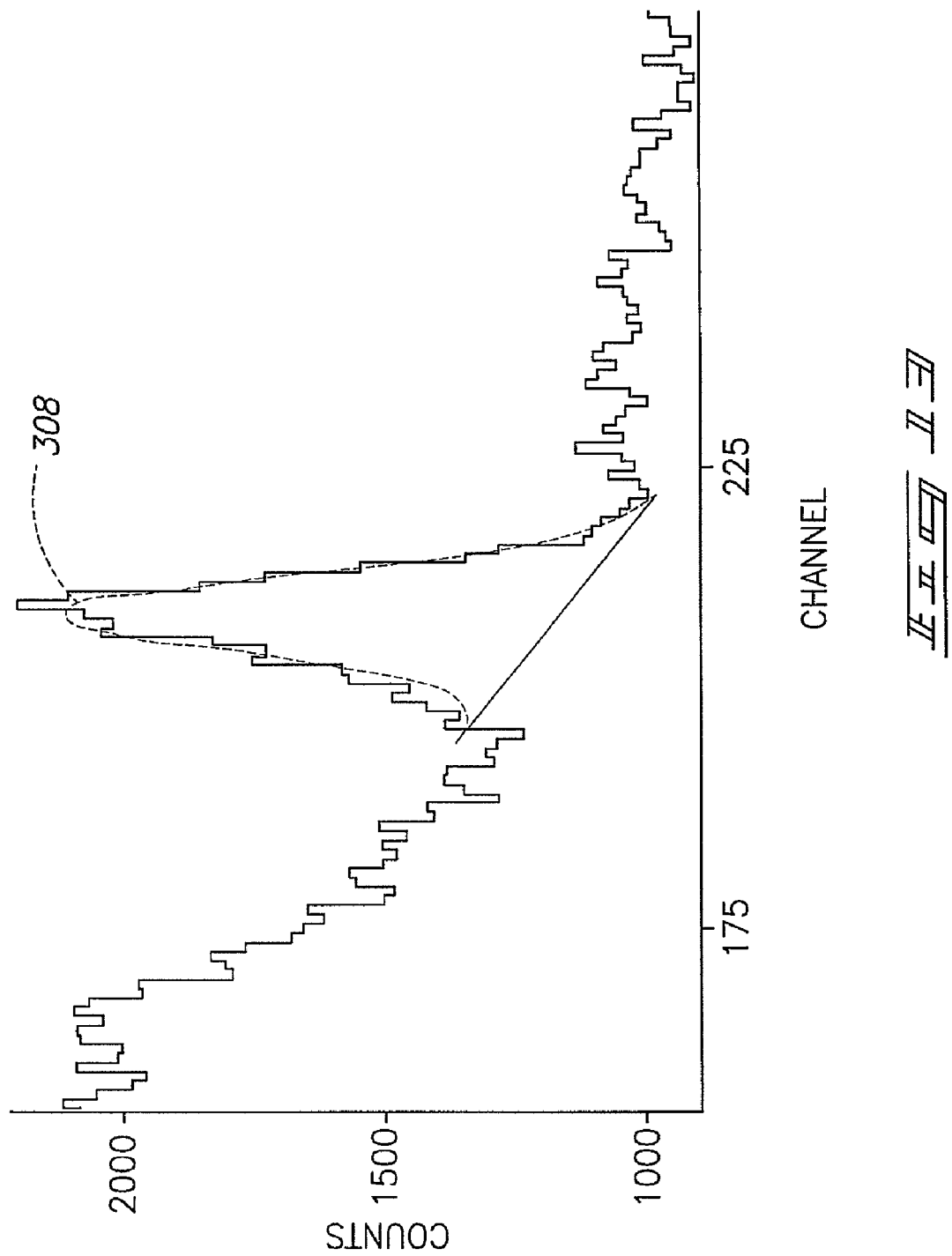
Figure 11:
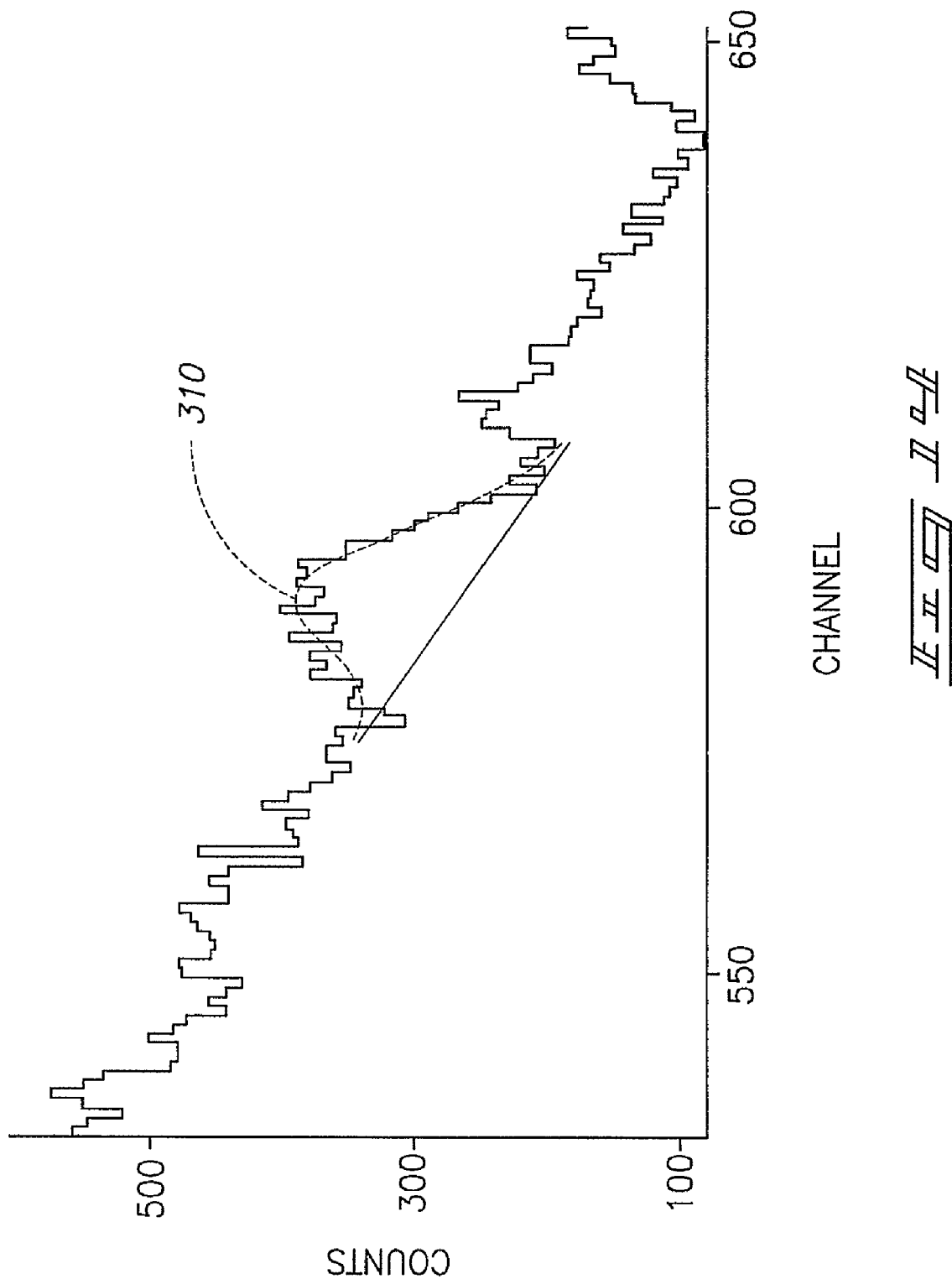

In step 100, regions containing peaks are defined, and the peaks themselves are generally defined using Gaussian curve fitting. FIG. 11 is graph showing an example of a typical NaI spectrum. Gaussian curve fitting is known in the art and is described, for example, in the following reference: Debertin, K. and Helmer, R. G., (1988) "Gamma- and X-Ray Spectrometry with Semiconductor Detectors," Amsterdam, The Netherlands: Elsevier Science B.V.

After performing step 100, the controller proceeds to step 102.

In step 102, a doublet is located in the annihilation region. A doublet is a pair of overlapping peaks that look like a single peak. As shown in FIG. 12, there is a sodium peak 302 and an annihilation peak 304 which together define a doublet 306. When a positron is slowed down to essentially zero energy, it will interact with an electron, the two will annihilate, and usually two photons of 511 keV will be produced. This 511 keV gamma ray, produced by the annihilation of the positron and electron, forms what is called the annihilation peak. After performing step 102, the controller proceeds to step 104.

In step 104, a predetermined energy value (e.g., 511 kiloelectron Volts or keV) is assigned to the centroid channel for one (e.g., the rightmost) peak in the doublet 306. An annihilation peak is known to have an energy value of 511 keV and the rightmost peak in the doublet 306 is the annihilation peak 304. The leftmost peak in the doublet 306 is a sodium peak 302. After performing step 104, the controller proceeds to step 106.

In step 106, a predicted H2223 peak centroid channel is calculated using, for example, a library derived equation. By H2223, what is meant is a Hydrogen peak at approximately 2223.25 keV. More particularly, in step 108, using a library of spectra with known calibrations, prediction equations are developed for a hydrogen 2223.25 keV peak location based on an annihilation peak location and a 6867.8 keV Na (sodium) peak. After finding the annihilation and sodium peaks (or doublet), the location of the hydrogen peak can be predicted using the prediction equations.

After performing step 106, the controller proceeds to step 110.

In step 110, the "best" peak is found in a region surrounding the predicted H2223 peak location. FIG. 13 is a graph illustrating Gaussian peak fitting to the hydrogen 2223 peak 308. A predetermined energy value (e.g., 2223.25 keV) is assigned to the centroid channel for the best peak. After performing step 110, the controller proceeds to step 112.

In step 112, the controller calculates a linear Na6868 peak centroid channel by a linear fit to the annihilation and hydrogen peaks. After performing step 112, the controller proceeds to step 114.

In step 114, a nonlinearity adjustment is applied to the linear Na6868 peak predicted centroid using the library-derived equation from step 108. After performing step 114, the controller proceeds to step 116.

In step 116, the controller finds the best peak in a region surrounding the predicted Na6868 peak location. FIG. 14 is a graph illustrating Gaussian peak fitting to a sodium 6868 peak 310. The controller assigns 6867.8 keV to the centroid channel for the best peak.

In step 118, a quadratic equation is fit to the annihilation, hydrogen and sodium peak centroids and energy values to produce the final energy calibration equation. There are many possible ways of fitting a quadratic equation. In the illustrated embodiment, a least squares fit is used. Least squares fits are described, for example, in the following reference: Debertin, K. and Helmer, R. G., (1988) "Gamma- and X-Ray Spectrometry with Semiconductor Detectors," Amsterdam, The Netherlands: Elsevier Science B.V.

Using a library of existing calibrated spectra to derive prediction equations is believed to be a significant improvement in energy calibration, which results in increased calibration speed and improved detection capability. The form and actual numerical values for the derived adjustment equations may vary from one application to the next, as well as might the method of deriving the equation from the library of spectra.

An example, using real numbers will now be provided for each of the steps. As an example, only, in step 100, the region containing the annihilation peak may be found, using Gaussian curve fitting, to be the region containing channel 48. In this example, the peak region boundaries may be found to be, for example, from channel 30 to channel 65.

Continuing the example, in step 102, the sodium/annihilation doublet peak is found within the annihilation region and the doublet is fit using Gaussian peak fitting. Let us say that, in the example, the annihilation peak centroid channel is found to be at channel 53.9. Continuing the example, in step 104, 511 keV is assigned to channel 53.9.

Continuing the example, in step 106, the Predicted Hydrogen Peak Centroid Channel is calculated using the library-derived equation:

Predicted Hydrogen Peak Centroid Channel=66.4+ 2.7*Annihilation Peak Centroid Channel=212.0.

In step 110, the region is then found from the region list containing the Predicted Hydrogen Peak Centroid Channel. In the example, the region from channel 201 to 236 is found. Gaussian peak fitting is performed to fit the hydrogen peak. In the example, the Hydrogen Peak Centroid Channel is found to be at channel 218.7. 2223.25 keV is assigned to this channel.

Continuing the example, in step 112, the slope and intercept are calculated for a linear prediction of the Sodium Peak Centroid Channel follows (the slash symbol "/" symbolizes division and the asterisk symbol "*" symbolizes multiplication):

Slope=(218.7−53.97)/(2223.25−511)=0.096

Intercept=53.97−Slope*511=4.79

The Linear Sodium Peak Centroid Channel Prediction is then calculated as follows:

Linear Sodium Peak Centroid Channel Prediction=Intercept+(Slope*6867.8)=665.5

Continuing the example, in step 114, a nonlinear adjustment is applied to the Linear Sodium Peak Centroid Channel Prediction using library-derived equation to get the Predicted Sodium Peak Centroid Channel, as follows:

Predicted Sodium Peak Centroid Channel=Linear Sodium Peak Centroid Channel Prediction+ 10.25+(−0.11*Linear Sodium Peak Centroid Channel Prediction)=601.7.

In step 116, in the example, a region (e.g., forty channels wide) is formed on either side of the Predicted Sodium Peak Channel and the sodium peak is fitted using Gaussian peak fitting. A Sodium Peak Centroid Channel is found at channel 606.7. 6867.8 keV is assigned to this channel.

Continuing the example, in step 118, a quadratic least squares calculation is fit to the (channel, keV) pairs for the annihilation, hydrogen, and sodium peaks to get the energy calibration equation:

Energy in keV=−15.7+9.6*Channel+ 0.0029*Channel*Channel. The above was but one example, to better enable one of ordinary skill in the art to understand the flowcharts. Other examples are, of course, possible depending on actual readings. In alternative embodiments, other quadratic equation fitting methods can be employed, other than least squares.

In some embodiments, the control system is configured to execute computer program code embodied in a computer readable medium. The program code, when executed in the control system, causes the control system to perform the steps of FIGS. 9 and 10. The computer readable medium can be any form of RAM, ROM, or EPROM, including CD-ROMs, DVDs, floppy disks, hard drives, memory sticks, tapes, etc. In some embodiments, the program code is embodied in a carrier wave transmitted over a computer network, such as over the Internet. In other words, in some embodiments, computer code which defines the steps of FIGS. 9 and 10 can be delivered to a customer or user by transmission over a network such as a LAN, WAN, or the Internet.

FIG. 15 is a cut-away perspective view of one of the racks 12 and shows the detectors 201-216 and neutron generator 18 supported by a frame 240. Insulation 242, e.g., bismuth of about 0.5 to 1 inch thick, surrounds each detector 201-216. Insulation, such as 5% borated poly 244 is provided around the neutron generator 18. Additional insulation 246 and 248, such as 4 inch thick bismuth, is provided between the neutron generator 18 and the detectors. While other dimensions are possible, in the illustrated embodiment, the distance from the center of one detector to the center of an adjacent detector to the left or right is 1.5 feet; for example, the distance from the center of detector 202 to the center of adjacent detector 204 is 1.5 feet. One of the detectors is 1.5 feet above the adjacent row; for example, detector 206 is 1.5 feet above adjacent detector 205. The horizontal distance from the center of detector 208 or 207 to the center of the neutron generator 18 is 3 feet. Other spacings are, of course, possible, but this spacing has been designed in particular for interrogation of a mid-sized truck.

FIG. 16 illustrates spacing between components in a rack, in one particular embodiment.

The system 10 can be used for military base, border, check point, building and embassy security.

The system 10 is a non-destructive, non-intrusive, and non-contact system. In other words, the system 10 can interrogate a vehicle without a need to open the vehicle and risk the life of the inspector.

The system 10 can detect explosives in a variety of sizes of vehicles, including mid-size delivery trucks, and can detect explosives concealed within a vehicle. The system 10 has a measurement and analysis time of five minutes or less. In some embodiments, the system 10 uses commercial off the shelf components as much as possible. Minimal training is needed to operate the system 10. Straightforward "go/no-go" reporting is provided. The system 10 can detect explosives such as ammonium nitrate and fuel oil (ANFO), pentaerythrite tetranitrate (PETN), composition 4 (C4), trinitrotoluene (TNT), etc. While the preferred embodiments have been described in connection with detection of nitrogen, in alternative embodiments, other or additional elements are detected that may be helpful in deciding whether there are explosives present.

In compliance with the statute, the invention has been described in language more or less specific as to structural and methodical features. It is to be understood, however, that the invention is not limited to the specific features shown and described, since the means herein disclosed comprise pre-

What is claimed is:

1. A method for calibrating acquired spectra for use in spectral analysis, comprising:
   performing Gaussian peak fitting to spectra acquired by a plurality of NaI detectors to define peak regions;
   locating a doublet defined by a sodium peak and an annihilation peak in the peak regions;
   assigning a predetermined energy level to one peak in the doublet; and
   predicting a Hydrogen peak location based on a location of at least one peak of the doublet.

2. The method of claim 1, further comprising performing Gaussian peak fitting to find a peak in a region surrounding the predicted Hydrogen peak location.

3. The method of claim 2, further comprising predicting a sodium peak location based on a location of the annihilation peak and the peak found in the region surrounding the predicted hydrogen peak.

4. The method of claim 2, further comprising predicting a sodium peak location using a linear fit to the location of the annihilation peak and the hydrogen peak.

5. The method of claim 2, further comprising predicting a sodium peak location using a linear fit to the location of the annihilation peak and the hydrogen peak and then applying a nonlinearity adjustment.

6. A method of claim 5, further comprising performing Gaussian peak fitting to find a peak in a region surrounding the predicted sodium peak location.

7. A method of claim 6, further comprising fitting a quadratic equation to the annihilation peak, the hydrogen peak, and the sodium peak to produce an energy calibration equation.

8. A control system, comprising:
   a processor configured to execute computer program code;
   a computer readable medium coupled to the processor and bearing computer program code configured to cause the processor to:
   define peak regions using Gaussian peak fitting;
   locate a sodium doublet defined by a sodium peak and an annihilation peak;
   assign a predetermined energy level to one peak in the doublet; and
   predict a hydrogen peak location based on a location of at least one peak of the doublet.

9. The control system of claim 8, wherein the computer program code is further configured to cause the processor to locate a peak in a region surrounding the predicted Hydrogen peak location using Gaussian peak fitting.

10. The control system of claim 9, wherein the computer program code is further configured to cause the processor to predict a sodium peak location based on a location of the annihilation peak and the peak in the region surrounding the predicted hydrogen peak location.

11. The control system of claim 9, wherein the computer program code is further configured to cause the processor to predict a sodium peak location using a linear fit to the location of the annihilation peak and the peak in the region surrounding the predicted hydrogen peak location.

12. The control system of claim 11, wherein the computer program code is further configured to cause the processor to apply a nonlinearity adjustment to the predicted sodium peak location.

13. The control system of claim 11, wherein the computer program code is further configured to cause the processor to find a peak in a region surrounding the predicted sodium peak location using Gaussian peak fitting.

14. The control system of claim 13, wherein the computer program code is further configured to cause the processor to fit a quadratic equation to the found annihilation, hydrogen, and sodium peaks to produce an energy calibration equation.

15. A method of calibrating spectra for use in spectral analysis, comprising:
   acquiring spectra data from a plurality of detectors;
   defining regions in the spectra comprising peaks using Gaussian curve fitting;
   locating a peak comprising a sodium and annihilation doublet;
   assigning a predetermined energy value to an annihilation peak in the sodium and annihilation doublet;
   predicting a location of a hydrogen peak region based on the location of the annihilation peak; and
   performing Gaussian peak fitting to the hydrogen peak region to locate a hydrogen peak.

16. The method of claim 15, wherein predicting the location of the hydrogen peak region comprises:
   developing prediction equations using a library of spectra with known calibrations to identify a location of a predicted hydrogen peak in relation to the annihilation peak; and
   forming a region on either side of the location of the predicted hydrogen peak.

17. The method of claim 15, further comprising calculating a slope and intercept between the annihilation peak and the hydrogen peak to calculate a linear sodium peak location.

18. The method of claim 17, further comprising applying a nonlinearity adjustment equation to the linear sodium peak location to obtain a linear sodium peak location prediction, the nonlinearity adjustment equation being derived from a library of spectra with known calibrations.

19. The method of claim 18, further comprising:
   performing Gaussian peak fitting to a region surrounding the linear sodium peak location prediction to locate a sodium peak; and
   assigning a predetermined energy level to the sodium peak.

20. The method of claim 19, further comprising fitting a quadratic equation to the annihilation peak, the hydrogen peak and the sodium peak to generate a final energy calibration equation.

* * * * *

UNITED STATES PATENT AND TRADEMARK OFFICE
CERTIFICATE OF CORRECTION

PATENT NO. : 7,795,595 B2  
APPLICATION NO. : 12/358883  
DATED : September 14, 2010  
INVENTOR(S) : Edward L. Reber et al.

Page 1 of 1

It is certified that error appears in the above-identified patent and that said Letters Patent is hereby corrected as shown below:

On the title page:
In ITEM (56) References Cited
    OTHER PUBLICATIONS
    PAGE 1, $2^{nd}$ column, $2^{nd}$ line of the
        $2^{nd}$ entry (line 20),          change "www.aip,org" to --www.aip.org--

In the specification:

| | | |
|---|---|---|
| COLUMN 1, | LINE 11, | change "10,2009," to --10, 2009,-- |
| COLUMN 2, | LINES 33,34 | change "DETAILED DESCRIPTION OF THE PREFERRED EMBODIMENTS" to --DESCRIPTION OF THE INVENTION-- |
| COLUMN 4, | LINE 47, | change "allows the" to --allows an-- |
| COLUMN 5, | LINE 66, | change "colors" to --colors,-- |
| COLUMN 6, | LINE 35, | change "is a screen" to --a screen-- |
| COLUMN 6, | LINE 42, | change "using which" to --using-- |
| COLUMN 11, | LINE 39, | change "follows" to --as follows-- |

Signed and Sealed this  
Third Day of December, 2013

Margaret A. Focarino  
*Commissioner for Patents of the United States Patent and Trademark Office*